US012656730B2

(12) United States Patent
Suzumura et al.

(10) Patent No.: US 12,656,730 B2
(45) Date of Patent: Jun. 16, 2026

(54) PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Yoshitaka Suzumura, Shizuoka (JP); Yuki Nasuno, Shizuoka (JP); Akio Nishi, Tokyo (JP); Atsushi Noguchi, Shizuoka (JP); Kazuaki Nagaoka, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/039,368

(22) Filed: Jan. 28, 2025

(65) Prior Publication Data

US 2025/0244712 A1 Jul. 31, 2025

(30) Foreign Application Priority Data

Jan. 29, 2024 (JP) ................................ 2024-010917

(51) Int. Cl.
*G03G 15/00* (2006.01)
*C08G 71/04* (2006.01)
*G03G 21/18* (2006.01)

(52) U.S. Cl.
CPC ......... *G03G 21/1814* (2013.01); *C08G 71/04* (2013.01); *G03G 21/1867* (2013.01)

(58) Field of Classification Search
CPC ........... G03G 15/0808; G03G 15/0812; G03G 15/0818; G03G 21/1814; G03G 21/1867; C08G 71/04
See application file for complete search history.

(56) References Cited

U.S. PATENT DOCUMENTS

| | | | | |
|---|---|---|---|---|
| 7,398,040 B2 * | 7/2008 | Yoshida | ............. | G03G 15/0812 399/284 |
| 7,727,134 B2 | 6/2010 | Nakamura et al. | | |

(Continued)

FOREIGN PATENT DOCUMENTS

| | | |
|---|---|---|
| EP | 3 974 909 A1 | 3/2022 |
| JP | 3-233479 A | 10/1991 |

(Continued)

OTHER PUBLICATIONS

U.S. Appl. No. 19/039,263, filed Jan. 28, 2025, Yuki Nasuno.
U.S. Appl. No. 19/039,297, filed Jan. 28, 2025, Atsushi Noguchi.

*Primary Examiner* — Hoang X Ngo
(74) *Attorney, Agent, or Firm* — VENABLE LLP

(57) ABSTRACT

A process cartridge comprising a developer carrying member and a developer layer thickness control member that contacts the developer carrying member and controls the layer thickness of the developer carried on the developer carrying member, wherein the developer carrying member comprises a substrate comprising a conductive outer surface, and a resin layer present on a side of the outer surface of the substrate, an impedance measured by providing a metal film directly on an outer surface of the developer carrying member is $1.00\times10^{6}\Omega$ or more, a specific relationship is satisfied between the ionization potential I(T) of the developer and the ionization potential I(R) of the outer surface of the developer carrying member, and the maximum value of the potential measured on the outer surface of the developer carrying member is less than 20.0 V.

12 Claims, 8 Drawing Sheets

(56) References Cited

U.S. PATENT DOCUMENTS

| | | | |
|---|---|---|---|
| 7,797,833 | B2 | 9/2010 | Nakamura et al. |
| 8,745,870 | B2 | 6/2014 | Kawamura et al. |
| 9,625,854 | B2 | 4/2017 | Koyanagi et al. |
| 9,846,407 | B2 | 12/2017 | Nakamura et al. |
| 10,571,825 | B1 | 2/2020 | Urushihara et al. |
| 10,678,161 | B2 | 6/2020 | Tsuru et al. |
| 10,705,449 | B2 | 7/2020 | Ishida et al. |
| 10,712,684 | B2 | 7/2020 | Wakabayashi et al. |
| 10,831,126 | B2 | 11/2020 | Matsunaga et al. |
| 10,831,127 | B2 | 11/2020 | Utsuno et al. |
| 10,942,471 | B2 | 3/2021 | Ogawa et al. |
| 11,256,191 | B2 | 2/2022 | Takeno et al. |
| 11,360,405 | B2 | 6/2022 | Tomono et al. |
| 11,360,426 | B2 | 6/2022 | Suzumura et al. |
| 11,465,383 | B2 | 10/2022 | Yamaguchi et al. |
| 11,650,516 | B2 | 5/2023 | Uesugi et al. |
| 12,158,724 | B2 | 12/2024 | Nishi et al. |
| 2015/0177642 | A1* | 6/2015 | Yoneima ................ G03G 15/09 399/276 |
| 2015/0248101 | A1 | 9/2015 | Hayashi et al. |
| 2022/0244658 | A1 | 8/2022 | Yamada et al. |
| 2023/0161275 | A1 | 5/2023 | Uno et al. |
| 2024/0004326 | A1 | 1/2024 | Sasaki et al. |
| 2024/0301236 | A1 | 9/2024 | Noguchi et al. |
| 2025/0314988 | A1* | 10/2025 | Hongo ............... G03G 15/0233 |

FOREIGN PATENT DOCUMENTS

| | | | |
|---|---|---|---|
| JP | 9-190074 | A | 7/1997 |
| JP | 2006-243057 | A | 9/2006 |
| JP | 2007-192891 | A | 8/2007 |
| JP | 2008-165214 | A | 7/2008 |
| JP | 2014-197064 | A | 10/2014 |
| JP | 5968257 | B2 | 8/2016 |
| JP | 2017-49282 | A | 3/2017 |
| JP | 6510936 | A | 5/2019 |
| JP | 2020-166227 | A | 10/2020 |

* cited by examiner

PROCESS CARTRIDGE AND ELECTROPHOTOGRAPHIC IMAGE FORMING APPARATUS

BACKGROUND OF THE INVENTION

Field of the Invention

The present disclosure relates to a process cartridge and an electrophotographic image forming apparatus.

Description of the Related Art

There is a need for an electrophotographic image forming apparatus to have a higher process speed, to be compatible with a variety of media, and to be compatible with various environments. In order to meet these needs, a method of imparting charge to a developer may be changed from the conventional triboelectric charging method to an injection charging method. In the injection charging method, a high voltage is applied to a developer layer thickness control member that contacts a developer carrying member, so that a charge could be transferred to the developer more quickly. The charge injected from the developer layer thickness control member to the developer can be controlled by the voltage on the developer layer thickness control member, so that the influence of the environment, such as temperature and humidity, can be expected to be reduced. Furthermore, by increasing the voltage on the developer layer thickness control member, an appropriate charge can be expected to be imparted to the developer even when the process speed is increased.

Japanese Patent Application Publication No. H03-233479 discloses a configuration that reduces the difference in triboelectric series between a developer, a developer layer thickness control member, and a developer carrying member in a process cartridge in which a voltage can be applied to the developer layer thickness control member. According to this publication, under certain conditions, it is possible to impart charge to the developer.

SUMMARY OF THE INVENTION

However, the present inventors have recognized that with the configuration disclosed in Japanese Patent Application Publication No. H03-233479, when an electrophotographic image forming apparatus with a high process speed is used in a high-temperature and high-humidity environment or a low-temperature and low-humidity environment, fogging may occur and the quantity of charge imparted to the developer may fluctuate. Specifically, fogging is more likely to occur in a high-temperature and high-humidity environment, and a decrease in dot reproducibility in a low-temperature and low-humidity environment is more likely to appear as coarseness.

The present disclosure is directed to providing a process cartridge and an electrophotographic image forming apparatus capable of suppressing the occurrence of fogging in a high-temperature and high-humidity environment and the occurrence of coarseness (reduced dot reproducibility) in a low-temperature and low-humidity environment through durable use in a system with a high process speed.

The present disclosure relates to a process cartridge comprising:

a developer, a developer carrying member, a developer layer thickness control member that contacts the developer carrying member and controls a layer thickness of the developer carried on the developer carrying member, a contact that is electrically connected to the developer layer thickness control member, and a developer storage member that stores the developer, wherein the process cartridge is detachably attached to a main body of an electrophotographic image forming apparatus, at least a part of the developer layer thickness control member is electrically conductive, where the process cartridge is attached to the main body of the electrophotographic image forming apparatus, the contact is electrically connected to a main body contact of the main body of the electrophotographic image forming apparatus, and a predetermined voltage can be applied to the developer layer thickness control member, the developer carrying member comprises a substrate comprising a conductive outer surface, and a resin layer present on a side of the outer surface of the substrate, where a metal film is provided directly on an outer surface of the developer carrying member, and an AC voltage with an amplitude of 50 V is applied with a frequency being changed between $1.0\times10^{-1}$ to $1.0\times10^{5}$ Hz while applying a DC voltage of 50 V between the outer surface of the substrate and the metal film in an environment of a temperature of 23° C. and a relative humidity of 50%, an impedance at a frequency of $1.0\times10^{0}$ to $1.0\times10^{1}$ Hz is $1.00\times10^{6}\Omega$ or more, where an ionization potential of the developer is denoted by I(T) and an ionization potential of the outer surface of the developer carrying member is denoted by I(R), I(T) and I(R) satisfy following formula (X):

$$|I(T) - I(R)| \leq 0.3 \text{ eV} \tag{X}$$

and where a corona discharger that has a grid portion with a width of 3.0 mm is arranged such that a distance between the grid portion and the outer surface of the developer carrying member is 1.0 mm and a width direction of the grid portion coincides with an axial direction of the developer carrying member in an environment with a temperature of 23° C. and a relative humidity of 50%, a voltage of 8 kV is applied to the grid portion, the corona discharger is moved along the axial direction of the developer carrying member relative thereto at a speed of 400 mm/sec to charge the outer surface of the developer carrying member, and a potential of the outer surface is measured 0.06 sec after passing the grid portion, the maximum value of the potential is less than 20.0 V.

The present disclosure relates to an electrophotographic image forming apparatus comprising a main body of the electrophotographic image forming apparatus, and a process cartridge detachably attached to the main body, wherein the process cartridge is the process cartridge described above, the main body has a main body contact that is electrically connected to the contact of the process cartridge when the process cartridge is attached to the main body, and a predetermined voltage can be applied to the developer layer thickness control member when the process cartridge is attached to the main body.

According to the present disclosure, it is possible to provide a process cartridge and an electrophotographic image forming apparatus capable of suppressing the occurrence of fogging in a high-temperature and high-humidity environment and coarseness (reduced dot reproducibility) in a low-temperature and low-humidity environment through durable use in a system with a high process speed.

Further features of the present invention will become apparent from the following description of exemplary embodiments with reference to the attached drawings.

DESCRIPTION OF THE EMBODIMENTS

Figure 1:
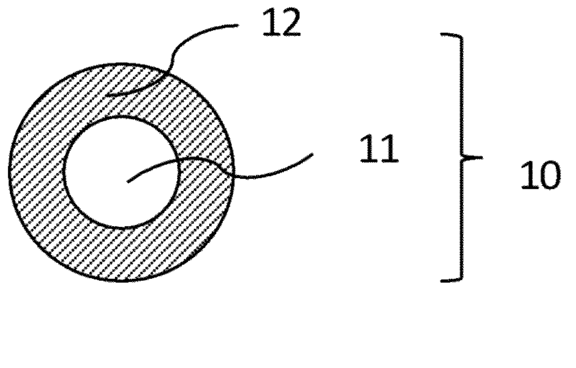
FIG. 1 is a schematic cross-sectional view showing an example of a developer carrying member.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ.

The present inventors have studied a configuration that can suppress the occurrence of fogging in a high-temperature and high-humidity environment and the occurrence of coarseness in a low-temperature and low-humidity environment through durable use in a system with a high process speed. The inventors have found that in the injection charging method, in which a voltage is applied to a developer layer thickness control member to impart a charge to the developer, it is more important to satisfy the following items than in the triboelectric charging method, in which the developer is charged by friction between the developer layer thickness control member and the developer carrying member.

Item (1): comprising a mechanism that can apply a voltage to the developer layer thickness control member to inject a charge into the developer.

Item (2): a developer carrying member should be such that the charge injected into the developer does not leak to the developer carrying member.

Item (3): the developer carrying member should be such that the excess charge that has been charged-up on the surface of the developer carrying member leaks out.

By satisfying the above items (1) to (3), the amount of charge injected into the developer can be controlled to a constant amount in a high-temperature and high-humidity environment and a low-temperature and low-humidity environment. Furthermore, by satisfying the following item (4), a very uniform, high-quality image with high dot reproducibility and little coarseness can be obtained.

Item (4): the triboelectric series of the developer and the developer carrying member should be configured to suppress the application of charge to the developer due to triboelectric charging.

The above items (1) to (4) are explained below.

First, when imparting charge to the developer by the injection charging method, the above items (1) and (4) are necessary.

According to item (1), a voltage is applied to the developer layer thickness control member, and the developer comes into contact therewith, so that charge is injected into the developer. Item (1) can be achieved by a process cartridge having a developer carrying member, a developer layer thickness control member that contacts the developer carrying member and controls the layer thickness of the developer carried on the developer carrying member, a contact that is electrically connected to the developer layer thickness control member, and a developer storage member that stores the developer.

By satisfying item (4), it is possible to suppress the degree of charge imparted to the developer that is caused by friction between the developer and the developer carrying member. It is generally known that charge generated by triboelectric charging is easily affected by the surrounding environment. Specifically, when comparing charge generated by triboelectric charging in a normal temperature and normal humidity environment with charge generated in a low-temperature and low-humidity environment, the developer will obtain more charge in the latter environment. In addition, since the amount of friction varies depending on the contact opportunity between the developer carrying member and the developer, the charge quantity per particle of the developer shows broad charging performance, such that some developer particle has a high charge quantity and some have a low charge quantity. The present disclosure is characterized by reducing the charge quantity of the developer generated by this triboelectric charging and increasing the charge quantity of the developer generated by injection charging, which will be described hereinbelow.

As regards item (4), in the present disclosure, the triboelectric series of the developer and the developer carrying member is expressed by ionization potential. Ionization potential is a physical property value that indicates the degree of charge release. Where two substances with different ionization potentials are brought into contact and rubbed against each other, charge moves from the substance with the smaller ionization potential to the substance with the larger ionization potential. As a result, the substance with the smaller ionization potential is positively charged, and the substance with the larger ionization potential is negatively charged.

In the present disclosure, where the ionization potential of the developer is denoted by I(T) and the ionization potential of the outer surface of the developer carrying member is denoted by I(R), I(T) and I(R) satisfy the following formula (X).

$$|I(T)-I(R)| \leq 0.3 \text{ eV} \quad (X)$$

Formula (X) indicates that the respective triboelectric series (ionization potentials) of the developer and the developer carrying member are close. By satisfying this condition, the charge imparted to the developer by triboelectric charging when the developer carrying member and the developer are rubbed against each other can be suppressed. Therefore, coarseness can be suppressed. The control of the ionization potential of the developer and the developer carrying member and the method of measuring the ionization potential are described hereinbelow.

By satisfying item (2), when charge is injected into the developer from the developer layer thickness control member to which a voltage is applied, leakage of the charge of the developer to the developer carrying member can be suppressed. That is, as regards item (2), where a metal film is provided directly on the outer surface of the developer carrying member, and an AC voltage with an amplitude of 50 V is applied with the frequency being changed between $1.0\times10^{-1}$ to $1.0\times10^{5}$ Hz while applying a DC voltage of 50 V between the outer surface of the substrate and the metal film in an environment of a temperature of 23° C. and a relative humidity of 50%, the impedance at a frequency of $1.0\times10^{0}$ to $1.0\times10^{1}$ Hz is $1.00\times10^{6}\Omega$ or more.

Figure 9:
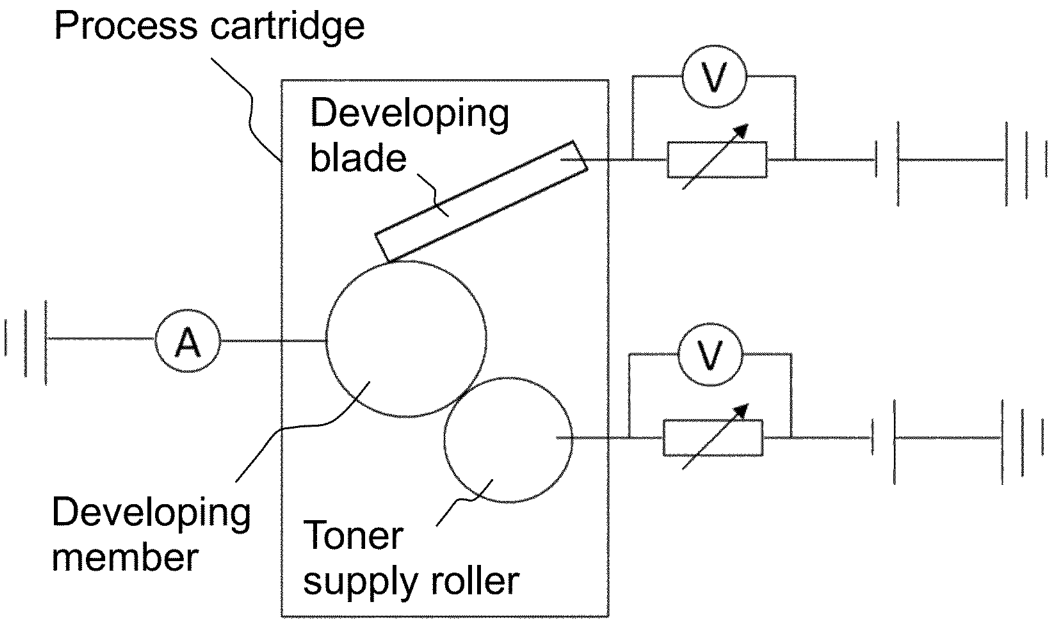
FIG. 9 is a schematic view of a circuit for measuring leakage current flowing from a developer to a developer carrying member.

This impedance is a physical property value that indicates the charge leakage from the developer to the developer carrying member. According to the study by the inventors, the current value (leakage current value) of the current flowing through the developer carrying member when a blade bias is applied to the developer layer thickness control member was measured according to the circuit diagram shown in FIG. 9. As a result, it was found that this current value shows a higher correlation with the impedance value of the developer carrying member than the electrical resistance value of the developer carrying member.

In other words, this shows that it is necessary to consider the influence of not only the resistance component of the developer carrying member but also the capacitance component when estimating charge leakage. This is considered to be because, when the electrical characteristics of the developer carrying member are pseudo-represented by an RC parallel circuit, the charge is sufficiently stored in the capacitor component, and the transient state until the steady state dominated by the resistance component is reached has a large influence on the charge leakage.

The voltage application condition for impedance measurement is an AC voltage of 50 V superimposed on a DC voltage of 50 V. That is, a sine wave with minimum and maximum applied voltages of 0 V and 100 V (Vpp 100 V) is applied. This value of Vpp 100 V is the assumed maximum value of the shared voltage applied to the developer carrying member when a voltage is applied so that a voltage difference of 300 V is applied between the developer carrying member and the developer layer thickness control member in an electrophotographic image forming apparatus.

Impedance exhibits bias dependency and has the property of decreasing as the bias increases, but it is known that the degree of this decrease differs depending on the developer carrying member. In conventional impedance measurements of developer carrying members, a voltage application condition of 1 V AC voltage is generally used. However, the application condition of 1 V AC voltage is clearly smaller than the voltage (generally several hundred V) applied between the developer carrying member and the developer layer thickness control member in an actual electrophotographic image forming apparatus. Therefore, such condition often makes it impossible to simulate the behavior of the developer carrying member in an electrophotographic image forming apparatus and is often unsuitable as an impedance measurement condition.

Accordingly, in the present disclosure, voltage application conditions that simulate a high blade bias applied in an actual electrophotographic image forming apparatus are adopted. In addition, the sine wave with a minimum applied voltage of 0 V simulates a square wave that is generally used in applying the blade bias to an actual electrophotographic image forming apparatus.

In the present disclosure, the impedance at frequencies of from $1.0\times10^{0}$ to $1.0\times10^{1}$ Hz is specified, but the low-frequency range of frequencies of from $1.0\times10^{0}$ to $1.0\times10^{1}$ Hz is a region where the transient state is completed and a steady state dominated by the resistance component is reached. In other words, the influence of both the capacitance component and the resistance component is reflected, and this region is suitable for ascertaining the charge leakage from the developer to the developer carrying member. Where the impedance at a frequency of from $1.0\times10^{0}$ to $1.0\times10^{1}$ Hz is $1.00\times10^{6}\Omega$ or more, the charge leakage is low, and under a high blade bias, charge leakage from the developer to the developer carrying member is suppressed, and a decrease in the charge quantity of the developer can be prevented.

Item (3) is related to the surface potential of the developer carrying member and indicates the characteristic of attenuating excess charge that has been charged-up on the surface of the developer carrying member. In the present disclosure, charge is injected into the developer by the voltage difference applied between the developer layer thickness control member and the developer carrying member. Where excess charge remains on the surface of the developer carrying member, the voltage difference decreases, and the charge quantity that can be injected into the developer decreases. The surface of the developer carrying member is imparted with the attenuation characteristic in order to control the charge quantity injected into the developer at a constant level.

Item (3) defines the attenuation characteristic of the surface of the developer carrying member as follows. In the present disclosure, a voltage of 8 kV is applied to the grid portion, and the corona discharger is moved along the axial direction of the developer carrying member relative thereto at a speed of 400 mm/sec. At this time, the potential of the outer surface of the developer carrying member is checked 0.06 sec after passing the grid portion of the corona discharger. Where the maximum value of the surface potential of the outer surface is less than 20.0 V, the occurrence of image defects caused by excessive charging of the developer can be suppressed even in an electrophotographic image forming apparatus with a high process speed, in which the time until the developer charged by the developer layer thickness control member is transported to the photosensitive member is shorter. The timing of 0.06 sec after passing the grid portion of the corona discharger simulates an apparatus with a high process speed.

By satisfying the above items (2) and (3), it is possible to solve, at a high level, the conflicting problems of preventing charge leakage from the developer to the developer carrying member and removing the charge that has been charged-up on the surface of the developer carrying member. Therefore, it is possible to suppress the occurrence of fogging in a high-temperature and high-humidity environment and coarseness in a low-temperature and low-humidity environment.

By combining the above items (1) to (4) in this way, the ratio of the charge of the developer applied by triboelectric charging can be suppressed and that applied by injection charging can be increased at the same time. Furthermore, it is possible to control the charge of the developer obtained by injection charging to a constant level.

As a result, the charge distribution of the developer becomes uniform, and high-quality images with less coarseness can be obtained throughout the durability. Furthermore, even in an electrophotographic image forming apparatus with a high process speed, a high-quality image with less fogging and coarseness can be obtained throughout the durability in both high-temperature and high-humidity and low-temperature and low-humidity environments.

As regards item (4), where formula (X) is not satisfied, the effect of charge imparted to the developer by triboelectric charging increases. This may result in a decrease in image quality, such as coarseness. $|I(T)-I(R)|$ is, for example, from 0 to 0.3, preferably from 0 to 0.2, and more preferably from 0 to 0.1.

As regards item (2), where the impedance of the developer carrying member is less than $1.00\times10^{6}\Omega$, the charge of the developer is likely to leak to the developer carrying member. As a result, there is a possibility that fogging in a high-temperature and high-humidity environment cannot be suppressed. The impedance is preferably from $1.00\times10^{6}$ to $5.00\times10^{7}\Omega$, more preferably from $2.00\times10^{6}$ to $5.00\times10^{7}\Omega$, even more preferably from $7.00\times10^{6}$ to $5.00\times10^{7}\Omega$, and still more preferably from $7.00\times10^{6}$ to $2.00\times10^{7}\Omega$.

As regards item (3), where the surface potential of the above-mentioned developer carrying member is 20.0 V or more, the potential difference between the developer layer thickness control member and the developer carrying member is likely to decrease due to the influence of the charge charged-up on the surface of the developer carrying member. For this reason, when continuous printing is performed, the charge of the developer decreases, fogging tends to occur and image quality tends to decrease. The lower the surface potential of the developer carrying member, the more preferable it is, and there is no particular lower limit. A preferred range of the surface potential of the developer carrying member is, for example, 0 V or more and less than 20.0 V, particularly from 0 to 10.0 V, and more preferably from 0 to 7.0 V.

The present disclosure will be described in detail hereinbelow.

Developer Carrying Member

A developer carrying member according to at least one aspect of the present disclosure has a substrate having a conductive outer surface and a resin layer present on the outer surface side of the substrate.

An example of a developer carrying member is shown in FIG. 1. A developer carrying member 10 shown in FIG. 1 has a resin layer 12 laminated on the outer surface, which is the outer peripheral surface of a cylindrical or hollow cylindrical substrate 11.

Figure 2:
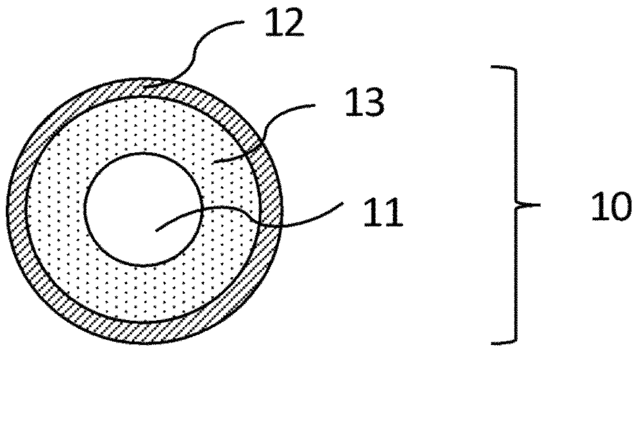
FIG. 2 is schematic cross-sectional view showing another example of a developer carrying member.

The layer configuration of the developer carrying member is not limited to the embodiment shown in FIG. 1. Another layer may be provided between the substrate 11 and the resin layer 12. In another embodiment of the developer carrying member, the developer carrying member has an elastic layer 13 as an intermediate layer between a substrate 11 and the resin layer 12 provided on the outer peripheral surface of the substrate, as shown in FIG. 2. The resin layer 12 is, for example, a surface layer. The outer surface of the resin layer 12 is preferably the outer surface of the developer carrying member.

Substrate

The substrate has a conductive outer surface and functions as a support member for the developer carrying member, and in some cases as an electrode. Specific examples of the substrate are preferably solid cylindrical or hollow cylindrical bodies.

Materials constituting the substrate can be selected, as appropriate, from those known in the field of conductive materials for electrophotography and materials usable as the developer carrying member. Examples include metals such as aluminum and stainless steel, carbon steel alloys, conductive synthetic resins, and metals and alloys such as iron and copper alloys.

Furthermore, the material constituting the substrate may be subjected to an oxidation treatment, or a plating treatment with chromium, nickel, or the like. As the type of plating, either electroplating or electroless plating can be used. The electroless plating is preferable from the viewpoint of dimensional stability. Examples of the electroless plating that can be used here include nickel plating, copper plating, gold plating, and various other types of alloy plating. The plating thickness is preferably 0.05 μm or more, and considering the balance between work efficiency and rust prevention ability, the plating thickness is preferably from 0.1 to 30 μm.

A primer may be applied to the surface of the substrate to improve adhesion between the substrate and the resin layer. As the primer, a known one can be selected and used according to the rubber material for forming the conductive layer, the material of the support, and the like. Examples of the primer material include thermosetting resins and thermoplastic resins, and specifically, materials such as phenolic resins, polyurethanes, acrylic resins, polyester resins, polyether resins, and epoxy resins can be used.

Resin Layer

Binder Resin

The developer carrying member comprises a resin layer on the outer surface of the substrate. For example, the resin layer is present on the outer surface of the developer carrying member. The resin layer may comprise a binder resin. A known material can be used as the binder resin of the resin layer. The binder resin of the resin layer is preferably a urethane resin, and more preferably a crosslinked urethane resin. The urethane resin (preferably a crosslinked urethane resin) is preferably a polyurethane having a polycarbonate structure in order to suppress charge leakage from the developer to the developer carrying member. That is, the resin layer preferably comprises a polyurethane having a polycarbonate structure. The polyurethane having a polycarbonate structure is more preferably a crosslinked urethane resin. Furthermore, in order to suppress charge leakage from the developer to the developer carrying member while maintaining a light load on the developer and sufficient wear resistance of the resin layer, it is more preferable to use a polyurethane having the structure described below as the binder resin of the resin layer.

The polyurethane having a polycarbonate structure preferably satisfies at least two of the following (A), (B), and (C). It may also satisfy all of the following (A), (B), and (C).

(A) The polyurethane has a structure represented by the following structural formula (1) in the molecule.

(B) The polyurethane has at least one structure selected from the group consisting of the structure represented by the following structural formula (2) and the structure represented by the following structural formula (3) in the molecule.

(C) The polyurethane has a structure represented by the following structural formula (4) in the molecule.

In other words, it is preferable that the polyurethane satisfies at least any one of the following.

The polyurethane has at least the structure represented by structural formula (1) and the structure represented by structural formula (2)

The polyurethane has at least the structure represented by structural formula (1) and the structure represented by structural formula (3)

The polyurethane has at least the structure represented by structural formula (1) and the structure represented by structural formula (4)

The polyurethane has at least the structure represented by structural formula (2) and the structure represented by structural formula (4)

The polyurethane has at least the structure represented by structural formula (3) and the structure represented by structural formula (4)

Among them, from the viewpoint of better fogging suppression and coarseness suppression, it is more preferable that the polyurethane has at least the structure represented by structural formula (1) and the structure represented by structural formula (2) in the molecule.

Structural formula (1)

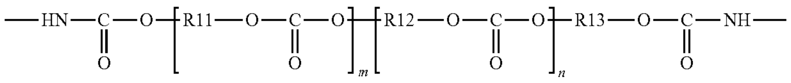

Structural formula (2)

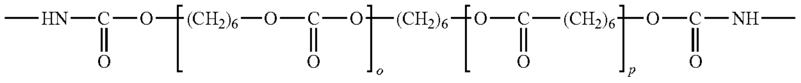

Structural formula (3)

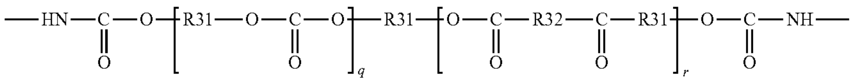

Structural formula (4)

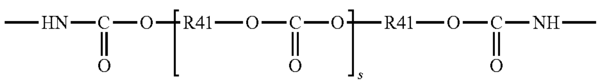

In structural formula (1), R11, R12, and R13 represent divalent hydrocarbon groups having 3 to 9 carbon atoms. However, R11 and R12 are different from each other, and R13 is the same as at least one selected from the group consisting of R11 and R12. m and n are the average number of moles added, and each independently represent a number of 1.0 or more (preferably from 1.0 to 20.0, more preferably from 2.0 to 12.0).

In structural formula (2), o and p are the average number of moles added, and each independently represent a number of 1.0 or more (preferably from 1.0 to 15.0, more preferably from 4.0 to 10.0).

In structural formula (3), R31 and R32 each independently represent a divalent hydrocarbon group having 3 to 8 carbon atoms. q and r each independently represent an average number of moles added, and each independently represent a number equal to or greater than 1.0 (preferably from 1.0 to 20.0, more preferably from 2.0 to 14.0).

In structural formula (4), R41 represents a divalent hydrocarbon group having 6 to 9 (preferably 5 to 8) carbon atoms. s represents an average number of moles added and represents a number equal to or greater than 1.0 (preferably from 1.0 to 22.0, more preferably from 4.0 to 18.0).

The structure represented by structural formula (1) is obtained by reacting a copolymerized polycarbonate polyol, in which crystallinity has been suppressed by bonding two carbonate groups with two different types of hydrocarbon groups, with an isocyanate. Because the crystallinity is suppressed, the cohesive energy in the soft segment is small, and the resin layer can be given flexibility and high volume resistivity.

By combining the structure of structural formula (1) with the structures of (2) to (4) described above and using them in the resin layer, the adhesiveness of the resin layer can be reduced. Therefore, it is possible to suppress adhesion of developer, powder, and the like to the surface of the resin layer, suppress an increase in the electrical resistance value of the surface of the resin layer due to contamination, and make it easier to uniformly charge the developer.

In structural formula (1), R11 and R12 are each independently a divalent hydrocarbon group having 3 to 9 carbon atoms. R11 and R12 are different from each other, and R13 is the same as at least one selected from the group consisting of R11 and R12.

Where the number of carbon atoms of R11 and R12 is 3 or more, the amount of carbonate groups, which are polar functional groups with strong cohesive energy, in the polyurethane having a polycarbonate structure is not too large, making it easier to maintain the resin layer flexible and with a high electrical resistance.

Further, where the number of carbon atoms of R11 and R12 is 9 or less, the amount of carbonate groups in the polyurethane is not too small, making it possible to maintain the strength of the polymer. Furthermore, since R11 and R12 have different structures, it is possible to suppress the crystallinity of the polymer and impart flexibility to the resin layer. m and n each independently represent a number of 1.0 or more. The hydrocarbon groups represented by R11, R12, and R13 may have a branched structure or a cyclic structure.

The structures represented by structural formula (2) and structural formula (3) are obtained by reacting a copolymer polyol, which is a copolymer of a polycarbonate structure and a polyester structure, with an isocyanate. By copolymerizing a polycarbonate structure and a polyester structure, the crystallinity of the polymer is suppressed, and by introducing an ester group, which has a stronger cohesive energy than a carbonate group, the soft segment is appropriately reinforced, so that the resin layer can be imparted with wear resistance.

When a resin layer is formed using a polymer in which the structure represented by structural formula (2) and/or structural formula (3) is combined with the structure of formula (1) or (4) described above, it is possible to impart the resin layer with sufficient volume resistivity while having a polar ester group, and it becomes easier to suppress charge leakage from the developer to the developer carrying member.

In structural formula (2), o and p each independently represent a number of 1.0 or more.

In structural formula (3), R31 and R32 each independently represent a divalent hydrocarbon group having 3 to 8 carbon atoms, and q and r each independently represent a number equal to or greater than 1.0. Where R31 and R32 each have 3 or more carbon atoms, the amount of carbonate groups and ester groups, which are polar functional groups with strong cohesive energy, in the polyurethane is not too large, and the resin layer can be maintained flexible. Where R31 and R32 each have 8 or less carbon atoms, the amount of carbonate groups and ester groups in the polyurethane is not too small, and the resin layer can be imparted with wear resistance.

The structure represented by structural formula (4) is obtained by reacting a highly crystalline polycarbonate polyol, in which two carbonate groups are bonded by a single hydrocarbon group, with an isocyanate. This structure is highly crystalline and easily arranged in the soft segment, and therefore can impart the resin layer with wear resistance and high volume resistivity. By forming a resin layer using a polymer in which the structure represented by structural formula (4) is combined with the structures of formulas (1) to (3) described above, the hardness of the resin layer does not become too high and can be easily controlled as appropriate.

In structural formula (4), R41 represents a divalent hydrocarbon group having 6 to 9 carbon atoms, and s represents a number of 1.0 or more. Where the number of carbon atoms of R41 is 6 or more, crystallinity is easily expressed, and the resin layer can be provided with wear resistance and high volume resistivity. Where the number of carbon atoms of R41 is 9 or less, excessive crystallinity can be suppressed, so that an increase in the hardness of the resin layer can be suppressed by further comprising at least one of the structures represented by structural formulas (1), (2), and (3) in the polymer.

The resin layer comprises a polymer having a urethane bond, i.e., a polyurethane having a polycarbonate structure, as a binder resin, and the polymer preferably satisfies at least two conditions selected from the group consisting of (A), (B), and (C) above. This makes the resin layer flexible and less susceptible to wear.

The structure of the polymer comprised in the resin layer of the developer carrying member can be confirmed by, for example, pyrolysis GC/MS, FT-IR, or NMR analysis.

A polyurethane having a polycarbonate structure can be produced using (A) a polyol compound and (B) a polyisocyanate compound. Usually, polyurethanes are synthesized by the following methods (1) and (2).

(1) A one-shot method in which a polyol component and a polyisocyanate component are mixed and reacted.

(2) A method in which an isocyanate-terminated prepolymer obtained by reacting a part of a polyol with an isocyanate is reacted with a chain extender such as a low molecular weight diol or low molecular weight triol.

In the present disclosure, the polyurethane may be synthesized by any of the above methods. A more preferred method is to subject a hydroxyl-terminated prepolymer obtained by reacting a raw material polyol with an isocyanate to a thermal curing reaction with an isocyanate-terminated prepolymer obtained by reacting a raw material polyol with an isocyanate.

The polyurethane having a polycarbonate structure is preferably a reaction product of a mixture comprising a hydroxyl-terminated prepolymer and an isocyanate-terminated prepolymer. The mixture can be used as a coating material liquid for forming a resin layer. The polyurethane having a polycarbonate structure is more preferably a reaction product of a mixture comprising a hydroxyl-terminated prepolymer and an isocyanate-terminated prepolymer, as well as a conductive filler and an additive.

When there are many hydroxyl groups, isocyanate groups, or urea bonds, allophanate bonds, isocyanurate bonds, and the like, there are many polar functional groups in the polyurethane, whereby the water absorption property of the polymer is enhanced and the volume resistivity of the resin layer is reduced, which may lead to charge leakage from the developer to the developer carrying member. Meanwhile, by thermally curing the above hydroxyl-terminated prepolymer and isocyanate-terminated prepolymer, it is possible to obtain a polyurethane with few unreacted polyols and polar functional groups without using an excessive amount of isocyanate.

(A) Polyol Compound

As the polyol compound, polyols known for urethane resin synthesis or that can be used for urethane resin synthesis can be used. Examples of polyol compounds include the following. Polycarbonate polyols, polyether polyols, polyester polyols, polyolefin polyols such as polybutadiene polyols and polyisoprene polyols, so-called polymer polyols obtained by polymerizing ethylenically unsaturated monomers in polyols, polyester polycarbonate copolymer polyols, and the like.

Among these, polycarbonate polyols and polyester polycarbonate copolymer polyols are preferred.

Examples of polycarbonate polyols include the following: polynonamethylene carbonate diol, poly(2-methyl-octamethylene) carbonate diol, polyhexamethylene carbonate diol, polypentamethylene carbonate diol, poly(3-methylpentamethylene) carbonate diol, polytetramethylene carbonate diol, polytrimethylene carbonate diol, poly(1,4-cyclohexanedimethylene carbonate) diol, poly(2-ethyl-2-butyl-trimethylene) carbonate diol, and random/block copolymers thereof.

Examples of polyester polycarbonate copolymer polyols include the following. Copolymers obtained by polycondensation of lactones such as &-caprolactone with the above polycarbonate polyols, and copolymers of polyesters obtained by polycondensation of diols such as 1,4-butanediol, 1,5-pentanediol, 1,6-hexanediol, 3-methylpentanediol, and neopentyl glycol with dicarboxylic acids such as adipic acid and sebacic acid.

(B) Polyisocyanate Compound

Polyisocyanates are selected from commonly used known ones, such as the following: toluene diisocyanate (TDI), diphenylmethane diisocyanate (MDI), polymeric diphenylmethane polyisocyanate, hydrogenated MDI, polymeric MDI, xylylene diisocyanate (XDI), hexamethylene diisocyanate (HDI), isophorone diisocyanate (IPDI), and the like. Among these, aromatic isocyanates such as toluene diisocyanate (TDI), diphenylmethane diisocyanate (MDI), polymeric diphenylmethane polyisocyanate, and polymeric MDI are more preferably used. Other polyisocyanates can also be used as long as they do not affect the impedance value and surface potential.

The ratio of the number of isocyanate groups to the number of hydroxyl groups (hereinafter also referred to as the "NCO/OH ratio") is preferably from 1.0 to 2.0. Where this NCO/OH ratio is from 1.0 to 2.0, the crosslinking reaction proceeds, and the so-called "bleeding", which is oozing of unreacted components and low molecular weight polyurethane, is suppressed. The NCO/OH ratio is more preferably from 1.0 to 1.6. Where this NCO/OH ratio is from 1.0 to 1.6, the bleeding is suppressed and the hardness of the polymer can be suppressed.

With any of the materials used, a urethane resin can be obtained by reacting the polyol and isocyanate by heating. Furthermore, if either or both of the polyol and isocyanate have a branched structure and have three or more functional groups, the obtained urethane resin becomes a crosslinked urethane resin.

In the present disclosure, the elastic modulus E1 in a region from the outer surface of the developer carrying member to a depth of 0.1 μm that is measured in a cross section in the thickness direction of the resin layer of the developer carrying member is preferably 200 MPa or more.

This elastic modulus E1 indicates that the surface of the developer carrying member is relatively hard. By having a hard surface of the developer carrying member, the contact area between the developer and the developer carrying member can be reduced even when the developer is pressed against the developer carrying member by the developer layer thickness control member. This reduces the chance of triboelectric charging between the developer carrying member and the developer. Furthermore, it is possible to prevent leakage of the charge of the developer to the developer carrying member.

The elastic modulus E1 is preferably from 200 to 700 MPa, and more preferably from 300 to 600 MPa.

As a means for controlling the elastic modulus E1 to a desired range, from the viewpoint of compatibility with item (3), it is preferable to form the following interpenetrating polymer network structure (IPN structure) on the surface of the developer carrying member.

As described above, the binder resin of the resin layer is preferably a urethane resin, and more preferably a crosslinked urethane resin. A crosslinked urethane resin is suitable as a binder because it has excellent flexibility and strength and can form the interpenetrating polymer network structure (IPN structure) described below. The crosslinked urethane resin is preferably, for example, a polyurethane having the above-mentioned polycarbonate structure.

The elastic modulus E2 in a region at a depth of from 1.0 to 1.1 μm from the outer surface of the developer carrying member that is measured in a cross section in the thickness direction of the resin layer of the electrophotographic roller, is, for example, from 1 to 150 MPa, preferably from 1 to 100 MPa, more preferably from 10 to 100 MPa, and even more preferably from 30 to 70 MPa.

Where E2 is within the above ranges, excessive stress is not applied to the developer, and cracking of the developer can be suppressed even when the developer is pressed against the developer carrying member by the developer layer thickness control member. This is preferable because a high-quality image can be obtained even in a higher durability evaluation. From the viewpoint of selectively increasing E1 without increasing E2, it is preferable to form the following interpenetrating polymer network structure (IPN structure) on the surface of the developer carrying member.

Surface Modifier

The ionization potential I(R) of the outer surface of the developer carrying member is preferably from 4.0 to 5.8 eV, and more preferably from 4.5 to 5.6 eV.

A means for controlling the ionization potential of the surface of the developer carrying member to a desired range will be described hereinbelow.

As a means for increasing the ionization potential of the surface of the developer carrying member, it is possible to have a large amount of material comprising silicon and/or fluorine on the surface of the developer carrying member. Conversely, as a means for decreasing the surface ionization potential, it is possible to have a large amount of material having an amino group on the surface of the developer carrying member.

As a specific means for increasing the ionization potential of the surface of the developer carrying member, it is preferable to use a surface modifier comprising silicon and/or fluorine in the resin layer of the developer carrying member. The surface modifier is preferably a (meth)acrylate monomer and/or oligomer having at least one or both of a silicone group and a fluorine group in the molecule. That is, it is preferable that the resin layer (preferably a crosslinked acrylic resin) comprise at least one group selected from a silicone group and a fluorine group in the molecule.

By using these groups, it becomes easier to control the ionization potential of the surface of the developer carrying member to a range of 4.6 to 5.6 eV. The type of acrylate monomer or oligomer used here is preferably a polyfunctional monomer or polyfunctional oligomer having a plurality of acryloyl groups or methacryloyl groups as functional groups in order to facilitate incorporation into the IPN structure.

Specifically, the (meth)acrylate monomer or oligomer having a silicone group in the molecule is a (meth)acrylate monomer or oligomer having the structure of the following formula (1). The silicone group preferably has a siloxane structure, and more preferably has the structure of the following formula (1).

(1)

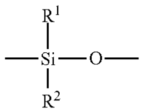

In formula (1), $R^1$ and $R^2$ each independently represent H or a hydrocarbon group having 1 to 4 carbon atoms (e.g., an alkyl group).

Examples of (meth)acrylate monomers or oligomers having a silicone group in the molecule include silicone (meth) acrylates such as silicone di(meth)acrylate and silicone hexa(meth)acrylate, and trifunctional alkylalkoxysilanes such as 3-methacryloxypropyltrimethoxysilane.

(Meth)acrylate monomers or oligomers having a fluorine group in the molecule are specifically (meth)acrylate monomers or oligomers having the structure of formula (2) below. For example, fluorine-modified acrylates can be mentioned. (Meth)acrylic acid alkyl esters in which at least a portion of the alkyl group is replaced with fluorine can be used.

(2)

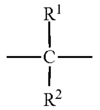

In formula (2), $R^1$ and $R^2$ each independently represent F or a hydrocarbon group having 1 to 4 carbon atoms (e.g., an alkyl group). At least one of $R^1$ and $R^2$ represents F.

Specifically, the (meth)acrylate monomer or oligomer having a silicone group and a fluorine group in the molecule is a (meth)acrylate monomer or oligomer having a structure in which at least one of $R^1$ and $R^2$ in the above formula (1) is a fluoroalkyl group (having 1 to 4 carbon atoms). For example, fluorine/acryl-modified organopolysiloxane can be mentioned.

From the viewpoint of surface orientation and compatibility when the above surface modifier is mixed with the raw material of the urethane resin, which is the binder resin, it is preferable that the weight-average molecular weight (Mw) of the surface modifier be from 200 to 3000. By having a weight-average molecular weight of 200 or more, the resin layer is easily phase-separated in the post-coating to curing process, and surface orientation is easily achieved. Furthermore, where the weight-average molecular weight is 3000 or less, the surface modifier is likely to be compatible. Where the weight-average molecular weight is 3000 or less, the above-mentioned surface modifier can be prevented from exuding onto the surface of the developer carrying member. This can prevent the surface modifier from forming an insulating film on the surface of the electrophotographic roller, making it easier to keep the surface potential low.

The amount of the surface modifier to be blended is preferably from 1.0 to 5.0 parts by mass per 100 parts by mass of the resin that constitutes the resin layer.

As a specific means for lowering the ionization potential of the surface of the developer carrying member, it is possible to have a large amount of material comprising an amino group. It is preferable to use a material comprising an amino group as the surface modifier.

Specifically, it is preferable to use an acrylic monomer and/or oligomer comprising an amino group as a surface modifier in the resin layer of the developer carrying member. By using these, it becomes easier to control the ionization potential of the surface of the developer carrying member to a range of from 4.0 to 4.6 eV. For example, amino (meth) acrylate can be mentioned.

As the type of acrylate monomer or oligomer used here, it is preferable to use a polyfunctional monomer or oligomer having multiple acryloyl groups or methacryloyl groups as functional groups in order to make it easier to incorporate into the IPN structure.

The preferable number of parts added and the range of the weight-average molecular weight (Mw) are as described hereinabove.

Crosslinked Acrylic Resin

It is preferable that the resin layer comprises a crosslinked urethane resin and a crosslinked acrylic resin. In the resin layer, the crosslinked urethane resin and the crosslinked acrylic resin preferably have an interpenetrating polymer network structure (IPN structure). The IPN structure is defined as a structure in which the network structures of two or more polymer compounds are intertwined and entangled with each other without being bonded by covalent bonds. The IPN structure in the resin layer is preferably formed by the crosslinked acrylic resin penetrating the network of the three-dimensional crosslinked structure of the crosslinked urethane resin.

The crosslinked acrylic resin is harder than the crosslinked urethane resin, so it is possible to increase the hardness of the outermost surface, but the crosslinked acrylic resin alone is insulating, so the surface potential may become extremely high. In addition, the crosslinked acrylic resin is brittle and is easily scratched by scraping due to friction. Meanwhile, in the case of an IPN structure in which the crosslinked acrylic resin has penetrated the network of the three-dimensional crosslinked structure of the crosslinked urethane resin near the outer surface of the resin layer, hardness and brittleness are unlikely to occur, and high strength can be imparted while maintaining flexibility.

Furthermore, the crosslinked acrylic resin is preferably a copolymer of the above-mentioned surface modifier and the (meth)acrylic monomer provided by impregnation. This configuration is preferable from the viewpoint of controlling the ionization potential and surface potential of the developer carrying member and achieving both the hardness E1 and E2 of the developer carrying member, which are preferable characteristics.

In order to form the IPN structure of crosslinked acrylic resin and crosslinked urethane resin on the outer surface and in the vicinity of the outer surface of the resin layer, the following method is preferable. A resin layer comprising crosslinked urethane is impregnated with a liquid (meth) acrylic monomer. This is cured simultaneously with the surface modifier in the resin layer.

The content of the crosslinked acrylic resin in the resin layer relative to 100 parts by mass of the crosslinked urethane resin is preferably from 1.0 to 5.0 parts by mass, and more preferably from 3.0 to 5.0 parts by mass.

The thickness of the resin layer is, for example, from 3 to 50 μm, preferably from 5 to 30 μm, and more preferably from 10 to 20 μm.

The type of (meth)acrylic monomer used here includes a polyfunctional monomer having a plurality of acryloyl or methacryloyl groups as functional groups in order to form a crosslinked structure. As the (meth)acrylic monomer used for the crosslinked acrylic resin, it is preferable to use a bifunctional (meth)acrylic monomer or a trifunctional (meth)acrylic monomer, and it is preferable to use these in combination.

The bifunctional (meth)acrylic monomer is preferably at least one selected from the group consisting of alkylene glycol di(meth)acrylates and alkylene oxide (ethylene oxide, propylene oxide) modified products of alkylene glycol di(meth)acrylates. For example, propylene oxide-modified neopentyl glycol diacrylate can be mentioned.

Examples of trifunctional (meth)acrylic monomers include trimethylolpropane tri(meth)acrylate and pentaerythritol tri(meth)acrylate.

The polymerization method of the (meth)acrylic monomer is not particularly limited, and a known method can be used. Specifically, methods such as heating and ultraviolet irradiation can be mentioned. For each polymerization method, a known radical polymerization initiator or ionic polymerization initiator can be used.

These polymerization initiators may be used alone, or two or more types may be used in combination.

The heating device and ultraviolet irradiation device may be any known devices. Examples of light sources for irradiating with ultraviolet rays include LED lamps, high-pressure mercury lamps, metal halide lamps, xenon lamps, and low-pressure mercury lamps. The cumulative amount of light required for polymerization may be adjusted, as appropriate, depending on the type and amount of the compound and polymerization initiator used.

Conductive Filler

The resin layer preferably comprises a conductive filler to obtain electrical conductivity. It is more preferable to use an electronic conductive agent as the conductive filler in the resin layer. The electronic conductive agent is preferably conductive particle that exhibit electronic conductivity and have a surface functional group that can interact with the functional group present in the additive described below.

Examples of electronic conductive agents that exhibit these properties include at least one selected from the group consisting of carbon black such as furnace black, thermal black, acetylene black, and Ketjen black, metal oxide-based conductive particle such as titanium oxide that has been surface-treated with acidic functional groups, and metal-based conductive particle such as aluminum and iron that have been surface-treated with acidic functional groups.

Among them, at least one selected from the group consisting of carbon black products with high stability of surface functional groups is preferably used. The conductive filler preferably comprises carbon black. Furthermore, in order to obtain the desired impedance value and surface potential, carbon black having a number-average diameter of primary particle of 30 nm or less, DBP absorption amount of 90 ml/100 g or less, and pH of 4.0 or less, which allows for higher degree of dispersion in the resin layer, is particularly preferably used.

When the number-average diameter of the primary particle of carbon black is 30 nm or less, the aggregate (primary aggregate), which is the smallest dispersible unit of carbon black, becomes small. As a result, the structure (the size of the particle connections) also becomes small, making it difficult to form conductive paths. Therefore, it is easy to obtain a sufficiently high impedance. The primary particle diameter of carbon black can be calculated using a transmission electron microscope (TEM). The lower the number-average diameter, the more preferable it is, and there is no particular lower limit. For example, the number-average diameter of the primary particle of carbon black is from 5 to 30 nm and more preferably from 20 to 28 nm.

Where the DBP absorption amount of carbon black is 90 ml/100 g or less, the structure of the carbon black becomes small and conductive paths are less likely to form, making it easier to obtain a sufficiently high impedance. The lower the DBP absorption amount, the more preferable it is, and there is no particular lower limit. For example, the DBP absorption amount of carbon black is from 30 to 90 ml/100 g and more preferably from 40 to 60 ml/100 g.

When the pH of carbon black is 4.0 or less, the repulsion of the surface functional groups of carbon black provides a dispersion stability effect and carbon black is unlikely to aggregate, making it easier to obtain a sufficiently high impedance. The lower the pH of carbon black, the more preferable it is, and there is no particular lower limit. For example, the pH of carbon black is from 2.0 to 4.0, and more preferably from 2.2 to 2.8.

However, even if the number-average diameter of the primary particle of carbon black, DBP absorption amount, and pH are within the above ranges, when polycarbonate urethane is used as the binder resin, it may not be fully dispersed and the desired impedance may not be obtained. The reason why carbon black, which has the desired raw material properties, cannot be dispersed when polycarbonate urethane is used as the binder resin is not clearly understood, but it is assumed to be as follows.

The hydroxyl group, which is the surface functional group of carbon black, easily interacts with the terminal hydroxyl group of polycarbonate diol. Meanwhile, the structure in which the carbonate bond and the hydrocarbon group are bonded and which is present between the two hydroxyl groups of polycarbonate diol is hydrophobic due to the presence of the hydrocarbon group and is unlikely to interact with carbon black. Since the structure is more stable when a hydrophobic segment is present close to another hydrophobic segment and when a hydrophilic segment is present close to another hydrophilic segment, hydrophilic carbon black will be present in the vicinity of similar hydrophilic carbon black. As a result, carbon black is likely to aggregate and is difficult to disperse.

In order to sufficiently disperse carbon black having the number-average diameter of primary particle, DBP absorption, and pH in the above-mentioned ranges when polycarbonate urethane is used as the binder resin, it is more preferable to add the additives described below.

It is desirable to add carbon black so that the desired volume resistivity is achieved, but the content thereof is preferably 30 parts by mass or less per 100 parts by mass of the resin component forming the resin layer. More preferably, the content of carbon black is from 10 to 30 parts by mass, and even more preferably from 15 to 25 parts by mass.

Where the content of carbon black is 30 parts by mass or less, the distance between the carbon black particles in the coating material liquid is appropriately maintained, the probability of collision due to Brownian motion of the carbon black is reduced, and the carbon black is less likely to aggregate. Therefore, the carbon black is easily dispersed and the dispersion stability is also improved. As a result, the carbon black is well dispersed in the resin layer formed by forming a film from the coating material liquid.

In order to achieve the above-mentioned specific impedance and surface potential, it is preferable to control the dispersion of the carbon black. Regarding the dispersed particle diameter of carbon black, when the arithmetic mean value of circle-equivalent diameter of the carbon black in the resin layer is denoted by Rc, it is preferable that Rc be 60.0 nm or less. When the standard deviation of the circle-equivalent diameter is σc [nm], it is preferable that σc/Rc be from 0.000 to 0.650.

In addition, regarding the distance between the carbon black particles, when the arithmetic mean value of the distance between the wall surfaces of carbon black in the resin layer is denoted by d, it is preferable that d be from 80.0 to 150.0 nm, and when the standard deviation of the distance between the wall surfaces is denoted by σd [nm], it is preferable that σd/d be from 0.000 to 0.600.

The reason why high impedance and low surface potential are more easily achieved with the above-mentioned numerical ranges of the circle-equivalent diameter and the distance between the wall surfaces is assumed to be as follows.

When the dispersed particle diameter is large, there are places where the distance between the wall surfaces is close, and conductive paths are easily formed, so both the impedance and the surface potential are low. Meanwhile, where the dispersed particle diameter is made smaller, the distance between the walls becomes more uniform, making it difficult for conductive paths to form and increasing resistance, while the capacitance also becomes smaller, resulting in higher impedance. In terms of surface potential, localized charge accumulation is less likely to occur, making it possible to lower the surface potential.

Where the carbon black surface is coated with an insulating material such as a silane coupling agent, it will no longer be able to function as a pseudo-capacitor. As a result, both the impedance and the surface potential are high.

It is also possible to use a plurality of types of carbon black in combination, provided that the impedance value and surface potential are not affected.

The arithmetic mean value Rc of the circle-equivalent diameter is more preferably from 40.0 to 60.0 nm, and even more preferably from 50.0 to 60.0 nm. σc/Rc is more preferably from 0.500 to 0.650, and even more preferably from 0.550 to 0.650. σc is more preferably from 25.0 to 45.0 nm, and even more preferably from 30.0 to 40.0 nm.

The arithmetic mean value Rc and standard deviation σc of the circle-equivalent diameter can be changed, for example, by the dispersion state in a mill or the like when preparing the coating material liquid for forming the resin layer. Weaker dispersion tends to increase Rc and σc, and stronger dispersion tends to decrease Rc and σc. Normally, Rc converges, so once a certain dispersion state is exceeded, σc can be reduced while Rc remains almost constant, and σc/Rc can be reduced.

The arithmetic mean value d of the distance between the walls is more preferably from 90.0 to 130.0 nm, and even more preferably from 105.0 to 115.0 nm. σd/d is more preferably from 0.500 to 0.600, and even more preferably from 0.550 to 0.590. σd is more preferably from 50.0 to 80.0 nm, and even more preferably from 60.0 to 70.0 nm.

The arithmetic mean value d and standard deviation σd of the distance between the walls can be changed, for example, by the dispersion state in a mill or the like when preparing the coating material liquid for forming the resin layer. Weaker dispersion tends to decrease d and increase σd, and stronger dispersion tends to increase d and decrease σd. Therefore, weaker dispersion tends to increase σd/d, and stronger dispersion tends to decrease σd/d.

Additives

It is also a preferred embodiment to use an additive to further improve the dispersibility of carbon black in the binder resin using polycarbonate urethane. Here, as the additive, for example, at least one compound selected from the group consisting of a compound having a structure represented by the following structural formula (5), a compound having a structure represented by the following structural formula (6), and a compound having a structure represented by the following structural formula (7) can be suitably used. One method for including the above additive in the surface layer is to include a dispersing agent in the coating material liquid for forming the surface layer. In the surface layer formed using a coating material liquid for forming a surface layer comprising at least one compound selected from the group consisting of a compound having a structure represented by structural formula (5) and a compound having a structure represented by structural formula (6), the compound may be incorporated at the end of the polymer chain of polyurethane. Even in such a case, the effect of improving the dispersibility of carbon black can be expected, but it is preferable that the additive be present in the surface layer independently of the polyurethane.

Among the compounds having the structures represented by structural formulas (5) to (7), the compound having the structure represented by structural formula (5) is more preferably used because particularly excellent dispersibility of carbon black and affinity with polycarbonate urethane can be achieved.

Structural formula (5)

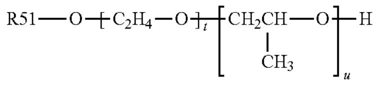

Structural formula (6)

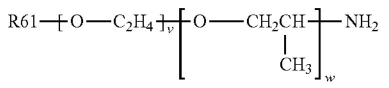

Structural formula (7)

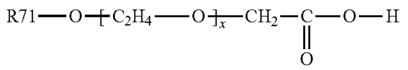

In structural formula (5), R51 represents a monovalent hydrocarbon group having 1 to 12 (preferably 3 to 12) carbon atoms. t and u represent the average number of moles added, each independently representing a number of 1 or more (preferably 5 to 30, more preferably 10 to 25).

In structural formula (6), R61 represents a monovalent hydrocarbon group having 1 to 8 (preferably 1 to 4) carbon atoms. v and w represent the average number of moles added, each independently representing a number of 1 or more (preferably 1 to 30, more preferably 5 to 30).

In structural formula (7), R71 represents a monovalent hydrocarbon group having 1 to 12 carbon atoms. x is the average number of moles added and is a number equal to or greater than 1 (preferably 1 to 30, more preferably 4 to 15).

Structural formula (5) is a polyoxyethylene polyoxypropylene alkyl ether, which is a polyether monool having a structure in which ethylene oxide and propylene oxide are addition polymerized in a block form. The terminal hydroxyl groups of this polyether monool interact through hydrogen bonds with the surface functional groups of carbon black, which is a conductive filler, and the polyether monool acts as a dispersing agent for the carbon black. In addition, the structure has good compatibility with polycarbonate urethane to enhance the effect as a dispersing agent for carbon black.

Ethylene oxide is introduced into the structure to ensure the uniform presence of additives in the polycarbonate urethane. This is thought to be because the ethylene groups in ethylene oxide have good compatibility with the hydrophobic hydrocarbon groups in the polycarbonate urethane. Furthermore, propylene oxide is introduced into the structure to improve the dispersibility of the conductive filler dispersed in the resin layer. This is thought to be because the side chain methyl group of propylene oxide interacts with the conductive filler, thereby improving dispersibility.

R51, which is a monovalent hydrocarbon group with 1 to 12 carbon atoms, is introduced into the structure to ensure uniform presence of additive in the polycarbonate urethane. Being a monovalent hydrocarbon group, this group has good compatibility with the hydrophobic hydrocarbon group in the polycarbonate urethane, allowing the additive to be uniformly present in the polycarbonate urethane. Because of 12 or less carbon atoms in the group, steric hindrance is unlikely to occur with the polycarbonate urethane, making it easier for the additive to be uniformly present.

Since the compound of formula (5) has a monool structure, it is less reactive than a diol. As a result, it is less likely to be involved in the urethanization reaction caused by the reaction of isocyanate with polyol, and a decrease in the resistance of the polyurethane caused by the introduction of an ether structure into the polycarbonate urethane is less likely to occur.

A commercially available polyoxyethylene polyoxypropylene alkyl ether can be used or it can be obtained by synthesis. The synthesis of polyoxyethylene polyoxypropylene alkyl ether can be performed by carrying out step (B) after step (A) below. Step (B) may be carried out on a commercially available product having a structure obtained by completing step (A).

Step (A): Reaction of alcohol with ethylene oxide.

Step (B): Reaction of the product obtained in step (A) with propylene oxide.

In step (A), the reaction can be advanced by adding ethylene oxide to alcohol in the presence of a catalyst at 50 to 200° C., more preferably at 100 to 160° C. Since ethylene oxide has a boiling point of 10.7° C. and is a gas at the above temperature, it is preferable to carry out the reaction in a pressurized environment in a sealed container. The pressure is preferably from 0.1 to 1.0 MPa. The reaction time is not particularly limited, but it is preferably about 1 to 3 h in order to reduce the amount of unreacted ethylene oxide.

As the catalyst, an acid catalyst or an alkali catalyst can be used, but an alkali catalyst is preferable in order to facilitate purification after the reaction. Examples of the alkali catalyst include hydroxides of alkali metals such as sodium hydroxide and potassium hydroxide, hydroxides of alkaline earth metals such as calcium hydroxide and barium hydroxide, ammonium hydroxide, tertiary amines, and the like. In view of the ease of reaction and reaction efficiency, sodium hydroxide and potassium hydroxide are particularly preferred. Examples of the acid catalyst include Bronsted acids such as sulfuric acid and phosphoric acid, and Lewis acids such as stannic chloride and boron trifluoride.

The amount of catalyst used is preferably from 0.1 to 5 mol % per 1 mol of alcohol for sodium hydroxide and potassium hydroxide. Since ethylene oxide reacts with water to produce ethylene glycol, it is important to prevent moisture from entering the reaction as much as possible, and a dehydration treatment may be performed, if necessary, before the reaction in step (A).

Step (B) can be performed under the same conditions as step (A). Since the boiling point of propylene oxide is 34.2° C., and it is a gas at reaction temperatures of from 50 to 200° C., it is preferable to carry out the reaction in a pressurized environment in a sealed container. The catalyst may be the one used in step (A) as it is or may be newly added. If a new catalyst is added, the one used in step (A) is preferable.

Structural formula (6) is a polyetheramine (monoamine) having a structure in which ethylene oxide and propylene oxide are addition polymerized in a block form. The terminal amino group of this polyetheramine interacts through hydrogen bonds with the surface functional group of carbon black, which is a conductive filler, and the polyetheramine acts as a dispersing agent for the carbon black. In addition, in order to enhance the effect as a dispersing agent, R61, which is a monovalent hydrocarbon group having 1 to 8 carbon atoms, is introduced, resulting in a structure that is likely to have affinity for the hydrophobic functional group of polycarbonate urethane and also has good compatibility with polycarbonate urethane.

A commercially available polyether monoamine can be used or it can be obtained by synthesis. The synthesis of polyether monoamine can be carried out by performing step (D) after step (C) below.

Step (C): Oxidation reaction of the compound of structural formula (5), which is a secondary alcohol.

Step (D): Reductive amination reaction of the product obtained in step (C).

Step (C) is a reaction to generate a ketone by oxidation reaction of a secondary alcohol. The synthesis of a ketone by oxidation of a secondary alcohol can be performed by an oxidation reaction using a heavy metal salt such as chromic acid and manganese dioxide and derivatives thereof, or by an oxidation reaction using non-heavy metal salts such as dimethyl sulfoxide (DMSO) and a hypohalous acids such as hypochlorous acid.

Either method may be used for synthesis, but in consideration of the environmental impact of heavy metals, the oxidation reaction using dimethyl sulfoxide (DMSO) and a hypohalous acid such as hypochlorous acid is preferred. Furthermore, dimethyl sulfoxide (DMSO) can react explosively at room temperature depending on the electrophilic activation reagent used, so a low temperature of −60° C. is required, making the method using a hypohalous acid more preferable. Hypohalous acids include hypochlorites such as sodium hypochlorite and calcium hypochlorite (bleaching powder). These hypochlorites can be reacted with secondary alcohols in acetic acid to give ketones.

When dimethyl sulfoxide (DMSO) is used, an electrophilic activating agent is also required. The electrophilic activating agent increases the electrophilicity of sulfur in DMSO, which is then subjected to a nucleophilic attack by the alcohol hydroxyl group. This nucleophilic attack produces a dimethylalkoxysulfonium salt, and this dimethylalkoxysulfonium salt decomposes to produce a ketone and dimethyl sulfide. Examples of electrophilic activating agents include dicyclohexylcarbodiimide (DCC), acetic anhydride, phosphorus pentoxide, sulfur trisulfide-pyridine complex, trifluoroacetic anhydride, oxalyl chloride, halogens, and the like.

Step (D) is a reductive amination reaction that converts a ketone to an amine. The reaction is divided into two steps. First, a carbonyl group reacts with an amine to produce an iminium cation. Next, a hydride reducing agent performs a nucleophilic attack on the iminium cation to produce an amine. A borohydride reagent is preferably used as the reducing agent. Examples of borohydride reagents include sodium cyanoborohydride, sodium triacetoxyborohydride, and 2-picoline borane. Among these, sodium triacetoxyborohydride and 2-picoline borane are preferred because of low toxicity thereof. In the reductive amination reaction using a borohydride reagent, where a bulky structure is formed, steric hindrance makes it difficult to generate the iminium cation. For this reason, R61 in structural formula (6) is preferably a monovalent hydrocarbon group having 1 to 8 carbon atoms.

Structural formula (7) is a polyoxyethylene alkyl ether acetic acid. The terminal carboxylic acid in structural formula (7) interacts with the surface functional group of carbon black, which is a conductive filler, through hydrogen bonding, and the polyoxyethylene alkyl ether acetic acid acts as a dispersing agent for carbon black. In addition, in order to enhance the effect as a dispersing agent, R71, which is a monovalent hydrocarbon group having 1 to 12 carbon atoms, is introduced, resulting in a structure that is likely to have affinity for the hydrophobic functional group of polycarbonate urethane and also has good compatibility with polycarbonate urethane.

A commercially available polyoxyethylene alkyl ether acetic acid can be used or it can be obtained by synthesis. The synthesis of polyoxyethylene alkyl ether acetic acid can be carried out by performing step (F) after step (E) below. Step (F) may be carried out on a commercially available product having a structure obtained by completing step (E).

Step (E): Reaction of alcohol with ethylene oxide.

Step (F): Oxidation reaction of primary alcohol, which is the product of step (E).

Step (E) is the same as step (A) and can be implemented in the same manner as step (A).

In step (F), a primary alcohol is oxidized to produce a carboxylic acid. In the oxidation of primary alcohol, aldehyde is produced, and subsequent oxidation produces a carboxylic acid, so it is necessary to select a reaction method and conditions that do not stop at the aldehyde. Methods for obtaining a carboxylic acid by oxidation of primary alcohol include oxidation with an oxidizing agent and catalytic dehydrogenation reaction with a catalyst. Examples of oxidizing agents include permanganates, chromic acid, ruthenium tetroxide, and hypochlorites. Catalysts for the dehydrogenation reaction include palladium, platinum, iridium, rhodium, and manganese.

Compounds represented by structural formulas (5) to (7) function as dispersing agents for carbon black and are also compounds with high affinity for polycarbonate urethane. Surfactants are usually used to improve the dispersibility and dispersion stability of carbon black. However, compounds represented by structural formulas (5) to (7) have a small number of functional groups that act on the surface functional groups of carbon black, so the surface activity thereof is weak and they are not generally used. Coupling agents and nonionic surfactants are commonly used as dispersing agents for carbon black.

Silane coupling agents, titanate coupling agents, and aluminum coupling agents are used as the coupling agents, and polyester and polyether surfactants are used as nonionic surfactants. However, where these dispersing agents are added to a level that sufficiently increases the dispersibility of carbon black in polycarbonate urethane (50-100% by mass relative to carbon black), the conductivity of the carbon black and binder resin will be hindered. Conversely, where the amount added is at a level that does not hinder the conductivity of carbon black and binder resin (10-40% by mass relative to carbon black), the dispersibility of carbon black cannot be obtained.

The content of the compounds represented by structural formulas (5) to (7) is preferably within the following ranges. The content of the compounds represented by structural formulas (5) to (7) in the resin layer is preferably from 3.0 to 7.0% by mass. This content is also preferably from 18.9 to 46.0 parts by mass relative to 100 parts by mass of carbon black.

By keeping the content of the additives in the resin layer within the above range, the dispersibility of carbon black in polyurethane is further improved, and the desired impedance value and surface potential can be more easily achieved.

The presence of additives in the resin layer can be confirmed and quantitative evaluation can be performed by the following methods. By cutting out the resin layer of the developer carrying member and using, for example, $^{1}H$-NMR, $^{13}C$-NMR, XPS, and FT-IR on the slice, the carbonate structure of the binder resin and the ether structure, amine structure, and carboxylic acid structure of the additives can be detected in the resin layer, and the ratio can be calculated from the peak ratio or the like.

Also, by immersing the slice in an organic solvent such as 2-butanone (methyl ethyl ketone; MEK) overnight for extraction, and using $^{1}H$-NMR, $^{13}C$-NMR, XPS, and FT-IR on the extract and the slice after extraction, the ratio of additives incorporated during the polymerization reaction of the resin and additives not incorporated can be calculated.

The following are embodiments of structures in which at least one of the compounds having the structures shown in structural formulas (5) and (6) is bonded to polyurethane (structures that react during the polymerization of polyurethane).

In the case of the structure represented by structural formula (5), the compound having the structure represented by structural formula (5) is a urethanated structure.

In the case of the structure represented by structural formula (6), the compound having the structure represented by structural formula (6) is a ureated structure.

Roughening Particles

The resin layer may comprise roughening particle. The roughening particle may be, for example, spherical particles. The particle diameter of the roughening particle is preferably, for example, in the range of from 1 to 150 μm, and more preferably in the range of from 5 to 30 μm. For example, at least one spherical particle selected from the following particles may be used.

Urethane resin particle, acrylic resin particle, phenolic resin particle, silicone resin particle, polyacrylonitrile resin particle, polystyrene resin particle, polyurethane resin particle, nylon resin particle, polyethylene resin particle, and polypropylene resin particle. Urethane resin particle is preferred.

The content of the roughening particle in the resin layer is preferably from 1 to 20% by mass, and more preferably from 5 to 15% by mass.

Intermediate Layer (Elastic Layer)

The electrophotographic roller may have an elastic layer as the intermediate layer 13 on the outer surface of the substrate. For example, the electrophotographic roller has an elastic layer between the substrate and the resin layer. The elastic layer is not particularly limited, and any known elastic layer for electrophotographic rollers may be used. For example, a cured product of an addition-curable liquid silicone rubber mixture may be used. The thickness of the intermediate layer may be, for example, from 1.0 to 20.0 mm, or from 8.0 to 15.0 mm.

The addition-curable liquid silicone rubber may be a known one, such as a liquid dimethylpolysiloxane having two or more silicon atom-bonded alkenyl groups in one molecule, or a liquid dimethylpolysiloxane having two or more silicon atom-bonded hydrogen atoms in one molecule. A filler such as carbon black may also be used in the addition-curable liquid silicone rubber mixture.

Method for Producing Resin Layer

A method for producing the electrophotographic roller preferably includes a step of preparing a substrate comprising a conductive outer surface, and a step of forming a resin layer on the outer surface side of the substrate. The step of forming the resin layer preferably includes a step of applying and curing a urethane raw material mixture comprising a urethane raw material and a surface modifier that form a crosslinked urethane resin to obtain a crosslinked urethane resin. Furthermore, it is preferable to impregnate the crosslinked urethane resin with a (meth)acrylic monomer that forms a crosslinked acrylic resin, polymerize the surface modifier and the (meth)acrylic monomer, form a crosslinked acrylic resin, and obtain a resin layer.

Before the step of forming the resin layer, a step of forming an elastic layer on the outer surface of the substrate may be performed. The elastic layer can be obtained, for example, by applying a silicone rubber mixture to the outer surface of the substrate and curing.

A method of forming the resin layer comprising the crosslinked urethane resin is not particularly limited, but a coating molding method using a liquid coating material is preferable. For example, it is preferable to disperse and mix each material for the resin layer as a urethane raw material mixture in a solvent to form a coating material, which is then coated on a conductive substrate and dried and solidified or heated and cured.

The solvent is preferably a polar solvent from the viewpoint of compatibility with polyols and isocyanate compounds, which are the raw materials for the crosslinked urethane resin. Examples of polar solvents include alcohols such as methanol, ethanol, and n-propanol, ketones such as acetone, methyl ethyl ketone, and methyl isobutyl ketone, and esters such as methyl acetate and ethyl acetate. Among these, one or more solvents that are compatible with other materials can be used in combination.

The solid fraction content when forming the coating materials can be freely adjusted by the amount of solvent mixed, but from the viewpoint of uniformly dispersing the electronic conductive material such as carbon black described hereinbelow, it is preferable to set the solid fraction content to from 20 to 40% by mass. For dispersion and mixing, a known dispersion device using beads such as a sand mill, a coating material shaker, a dyno mill, or a pearl mill can be used. In addition, as a coating method, dip coating, ring coating, spray coating, or roll coating can be used.

For example, a polyol, an isocyanate-based compound, and the like, which are raw materials of the binder resin, a conductive filler, a surface modifier, an additive, and the like are mixed to obtain a liquid coating material. Then, the resin layer coating material is applied to the above-mentioned substrate. The crosslinked urethane resin is then formed by drying and solidifying or by heating and curing. At this time, by setting the weight-average molecular weight of the surface modifier to 200 to 3000, the surface modifier can be easily oriented near the surface without exuding to the surface. At this point in time, the surface modifier is present in an unreacted state near the surface in the crosslinked urethane resin chain.

Next, the resin layer formed as described above is impregnated with a liquid (meth)acrylic monomer. The liquid (meth)acrylic monomer can be impregnated as it is, or as an impregnation treatment liquid diluted, as appropriate, with various solvents. By diluting, as appropriate, the liquid (meth)acrylic monomer with various solvents, a resin layer with a more uniform surface composition can be obtained.

The solvent can be freely selected as long as it satisfies both the affinity for the resin layer and the solubility of the (meth)acrylic monomer. For example, alcohols such as methanol, ethanol, and n-propanol, ketones such as acetone, methyl ethyl ketone, and methyl isobutyl ketone, and esters such as methyl acetate and ethyl acetate can be used.

The impregnation liquid is mixed with a polymerization initiator, as appropriate. Details of the polymerization initiator are as described above. There are no particular limitations on the method for impregnation with the impregnation liquid, and dip coating, ring coating, spray coating, or roll coating can be used. After the impregnation process, it is preferable to keep the air drying time to within 15 min to prevent the surface modifier added to the resin layer from exuding to the surface due to the solvent in the impregnation liquid. Then, drying is performed at 90° C. for 1 h to volatilize the solvent.

After the impregnation treatment is thus performed with the impregnation liquid, the (meth)acrylate monomer or oligomer added to the resin layer as a surface modifier and the (meth)acrylic monomer from the impregnation treatment are polymerized and cured at the same time. As the reaction progresses, the (meth)acrylate monomer or oligomer added to the resin layer is bulky and, therefore, is cured while being oriented toward the outermost surface. By such a step, it is easy to form an IPN structure in a mutually entangled form near the surface of the network structure of the crosslinked urethane resin in a state in which groups derived from the surface modifier, such as silicone groups and fluorine groups, are oriented on the outermost surface. The polymerization and curing methods are not particularly limited, and known methods can be used. Specific examples include methods such as heat curing and ultraviolet irradiation.

Developer

Next, the developer will be described. The developer is, for example, a toner. The toner preferably has a toner particle comprising a binder resin and an external additive on the surface of the toner particle.

Examples of vinyl resins used as binder resins include the following.

Homopolymers of styrene and substituted derivatives thereof, such as polystyrene and polyvinyltoluene;

styrene copolymers, such as styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, and styrene-maleic acid ester copolymer;

polymethyl methacrylate, polybutyl methacrylate, polyvinyl acetate, polyethylene, polypropylene, polyvinyl butyral, polyester resins, polyamide resins, epoxy resins, and polyacrylic acids.

These can be used alone or in combination. Among these, styrene copolymers, and also styrene-butyl acrylate copolymer, are particularly preferred from the viewpoint of ease of control of development characteristics and fixing performance.

Wax

Next, wax will be described. The toner particle may comprise wax. As the wax, waxes known for use in developers can be used.

For example, petroleum-based waxes such as paraffin wax, microcrystalline wax, and petrolatum and derivatives thereof;

montan wax and derivatives thereof;

hydrocarbon waxes produced by the Fischer-Tropsch method and derivatives thereof;

polyolefin waxes such as polyethylene and derivatives thereof;

natural waxes such as carnauba wax and candelilla wax and derivatives thereof; and the like. The derivatives include oxides, block copolymers with vinyl monomers, and graft modified products. In addition, higher aliphatic alcohols, fatty acids such as stearic acid and palmitic acid, acid amide waxes, ester waxes, hardened castor oil and derivatives thereof, vegetable waxes, animal waxes, and the like can also be used.

The wax content is preferably from 1 to 30 parts by mass per 100 parts by mass of the binder resin.

Colorant

Next, the colorant will be described. The toner particle may comprise a colorant. The colorant is selected taking into consideration the hue angle, chroma, lightness, lightfastness, OHP transparency, and dispersibility in the developer.

Carbon black, magnetic fine particle, and colorants toned black using the yellow, magenta, and cyan colorants described below can be used as black colorants.

Many dyes and carbon black have polymerization inhibition properties, so care must be taken when producing a developer through polymerization. In addition, when producing a magnetic developer, it is preferable to use magnetic fine particle as the black colorant, and the magnetic fine particle preferably has a number-average particle diameter of from 0.10 to 0.40 μm.

The content of the magnetic fine particle is preferably from 20 to 200 parts by mass, and more preferably from 40 to 150 parts by mass per 100 parts by mass of the polymerizable monomer or binder resin.

Yellow colorants are represented by compounds such as condensed azo compounds, isoindolinone compounds, anthraquinone compounds, azo metal complexes, methine compounds, and allylamide compounds. Specific examples include the following: C. I. Pigment Yellow 12, 13, 14, 15, 17, 62, 73, 74, 83, 93, 94, 95, 97, 109, 110, 111, 120, 128, 129, 138, 147, 150, 151, 154, 155, 168, 180, 185, and 214.

Examples of magenta colorants include condensed azo compounds, diketopyrrolopyrrole compounds, anthraquinones, quinacridone compounds, basic dye lake compounds, naphthol compounds, benzimidazolone compounds, thioindigo compounds, and perylene compounds. Specific examples include the following: C. I. Pigment Red 2, 3, 5, 6, 7, 23, 48:2, 48:3, 48:4, 57:1, 81:1, 122, 146, 166, 169, 177, 184, 185, 202, 206, 220, 221, 238, 254, and 269, and C. I. Pigment Violet Red 19.

Examples of cyan colorants include copper phthalocyanine compounds and derivatives thereof, anthraquinone compounds, and basic dye lake compounds. Specific examples include C. I. Pigment Blue 1, 7, 15, 15:1, 15:2, 15:3, 15:4, 60, 62, and 66.

These colorants can be used alone or in mixture, or even in the form of a solid solution.

The content of colorants other than magnetic fine particle is preferably from 1 to 20 parts by mass per 100 parts by mass of polymerizable monomer or binder resin.

Production Method

A method for producing the developer is not particularly limited, and the developer can be produced by a pulverization method, a dispersion polymerization method, an association aggregation method, a dissolution suspension method, a suspension polymerization method, or the like.

The developer particle comprised in the developer (particle before adding an external additive) can be produced by a pulverization method, but it is preferable to produce them in an aqueous medium by a dispersion polymerization method, an association aggregation method, a dissolution suspension method, a suspension polymerization method, or the like, and among these, the suspension polymerization method is more preferable.

In the suspension polymerization method, a colorant, and if necessary, a polymerization initiator, a crosslinking agent, a charge control agent, and other additives are dissolved or dispersed in a polymerizable monomer to obtain a polymerizable monomer composition. The polymerizable monomer composition is then added to an aqueous medium (which may comprise a dispersion stabilizer, if necessary) to form particle of the polymerizable monomer composition, and the polymerizable monomer comprised in the particle is polymerized to obtain developer particle. The developer obtained by the suspension polymerization method (hereinafter also referred to as "polymerized developer") has individual developer particle that are almost uniformly spherical in shape, which tends to improve flowability at the toner layer thickness control member and facilitates uniform triboelectric charging. As a result, image quality is likely to be improved.

Polymerizable monomers used in the production of polymerized developers include the following.

Examples of polymerizable monomers include styrenic monomers such as styrene, o-methylstyrene, m-methylstyrene, p-methylstyrene, p-methoxystyrene, p-ethylstyrene, and the like;

- acrylic acid esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate, phenyl acrylate, and the like;
- methacrylic acid esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, and the like; and the like.

Other examples include acrylonitrile, methacrylonitrile, acrylamide, and the like. These can be used alone or in combination of two or more kinds.

Among the above-mentioned polymerizable monomers, it is preferable to use styrene or styrene derivatives alone or in combination of two or more kinds from the viewpoint of the development characteristics and durability of the developer.

As the polymerization initiator, one having a half-life during the polymerization reaction of from 0.5 to 30.0 h is preferable. The amount used is preferably from 0.5 to 20.0 parts by mass per 100 parts by mass of the polymerizable monomer.

Specific examples of polymerization initiators include azo or diazo polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile, and peroxide polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, t-butylperoxy 2-ethylhexanoate, and t-butylperoxypivalate.

When producing developer particle by polymerization, a crosslinking agent may be added, and the preferred amount thereof is from 0.01 to 5.00 parts by mass per 100 parts by mass of polymerizable monomer.

Here, the crosslinking agent used is primarily a compound with two or more polymerizable double bonds, examples of which include the following.

Aromatic divinyl compounds such as divinylbenzene and divinylnaphthalene;

- carboxylic acid esters with two double bonds such as ethylene glycol diacrylate, ethylene glycol dimethacrylate, and 1,3-butanediol dimethacrylate;
- divinyl compounds such as divinylaniline, divinyl ether, divinyl sulfide, and divinyl sulfone; and
- compounds with three or more vinyl groups.

These may be used alone or as a mixture of two or more types.

As the dispersion stabilizer to be present in the aqueous medium, various surfactants, organic dispersing agents, and inorganic dispersing agents can be used. Among them, inorganic dispersing agents can be preferably used because they are less likely to produce harmful ultrafine powders and because dispersion stability is obtained due to the steric hindrance thereof. Examples of such inorganic dispersing agents include polyvalent metal phosphates such as tricalcium phosphate, magnesium phosphate, aluminum phosphate, zinc phosphate, and hydroxyapatite, carbonates such as calcium carbonate and magnesium carbonate, inorganic salts such as calcium metasilicate, calcium sulfate, and barium sulfate, and inorganic compounds such as calcium hydroxide, magnesium hydroxide, and aluminum hydroxide.

It is preferable to use from 0.2 to 20.0 parts by mass of these inorganic dispersing agents per 100 parts by mass of the polymerizable monomer. In addition, the dispersion stabilizers may be used alone or in combination of multiple types. Furthermore, a surfactant may be used in combination.

The obtained resin particles are filtered, washed, and dried to obtain toner particles as developer particles. After drying, the toner particles may be classified into coarse and fine particles, and external additives such as inorganic fine particles may be added to the toner particles.

External Additives

As the inorganic fine particle used as external additives, those having a number-average particle diameter of primary particle of from 4 to 80 nm are preferred, and those having a number-average particle diameter of from 6 to 40 nm are more preferred. In addition to the above inorganic fine particle, inorganic fine particle having a number-average particle diameter of primary particle of from 100 to 200 nm may be used in combination. By doing so, the flowability of the developer can be ensured throughout durability, and the concentration is likely to be improved.

The inorganic fine particles are added to improve the flowability of the developer and to control the charging performance of the developer particles. In the present disclosure, it is necessary to select inorganic fine particle from the viewpoint of controlling the triboelectric series of the developer. In order to control the triboelectric series to negative charging performance, a method of treating the inorganic fine particle surface with a silicone oil or a fluorine-based treatment agent can be mentioned. Conversely, in order to control the triboelectric series to positive charging performance, it is necessary to treat the inorganic fine particle surface with a treatment agent such as aminosilane.

The number-average particle diameter of the primary particle of the inorganic fine particle is measured using a photograph of the developer taken enlarged with a scanning electron microscope.

As the inorganic fine particle, fine particle of silica, titanium oxide, alumina, and the like, or fine particle of composite oxides thereof can be used. As the silica fine particle, for example, dry silica, also called dry-method silica or fumed silica, which is produced by vapor phase oxidation of silicon halide, and wet silica can be mentioned.

The amount of inorganic fine particle added is preferably from 0.1 to 4.0 parts by mass per 100 parts by mass of developer particle. The content of inorganic fine particle can be quantified using a calibration curve created from a standard sample using fluorescent X-ray analysis.

The triboelectric series of the developer is represented by the value of the ionization potential. The ionization potential I(T) of the developer is preferably from 4.0 to 5.6 eV, and more preferably from 4.5 to 5.6 eV. Within the above range, it is easy to control the difference in ionization potential of the developer carrying member to a suitable range.

The ionization potential I(T) of the developer can be controlled by the surface treatment agent of the external additive used in the developer. The external additive is preferably subjected to surface treatment. A surface treatment agent having an amino group is likely to decrease I(T). Furthermore, a surface treatment agent comprising fluorine is likely to increase I(T).

Process Cartridge and Electrophotographic Image Forming Apparatus

Figure 3:
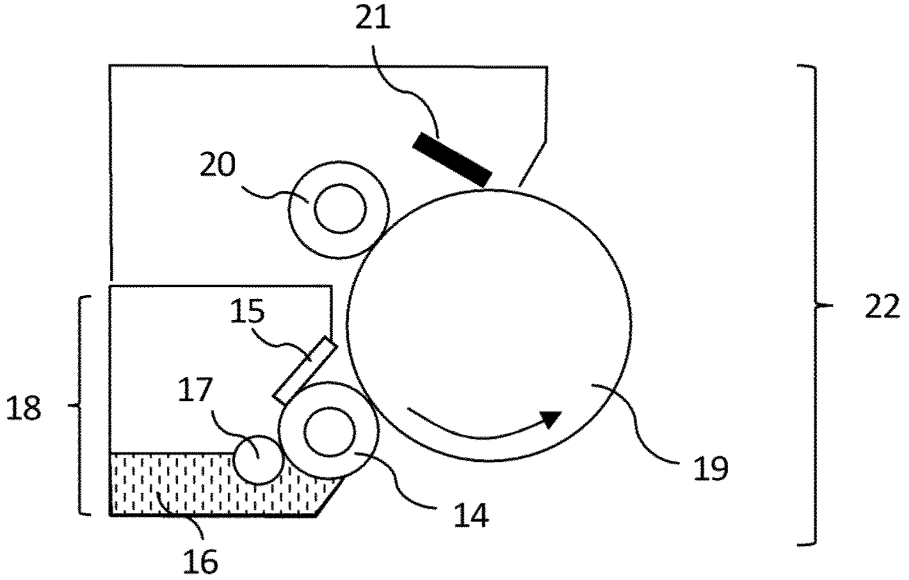
FIG. 3 is schematic view of a process cartridge.

The developer carrying member according to the present disclosure can be suitably used as a developer carrying member, developer supply roller, and developing sleeve in a process cartridge. FIG. 3 is a schematic cross-sectional view of an example of a process cartridge according to one aspect of the present disclosure. In FIG. 3, the developer carrying member is installed as a developer carrying member 14.

A process cartridge 22 is configured to be detachably attached to the main body of an electrophotographic image forming apparatus. That is, the electrophotographic image forming apparatus has a main body of the electrophotographic image forming apparatus and a process cartridge detachably attached to the main body. In the process cartridge 22, a developing device 18 comprising the developer carrying member 14 and a developer layer thickness control member 15, a photosensitive member 19, a charging roller 20, and a cleaning blade 21 are integrated. The developer layer thickness control member 15 is, for example, a developing blade. The developing device 18 further comprises a developer storage section filled with a developer 16. The developer 16 is supplied to the surface of the developer carrying member 14 by a developer supply roller 17, and a layer of the developer 16 having a predetermined thickness is formed on the surface of the developer carrying member 14 by the developer layer thickness control member 15.

The developer carrying member 14 is in contact with the photosensitive member 19 and is driven to rotate at a predetermined peripheral speed ratio with respect to the photosensitive member 19. The developer layer thickness control member 15 has at least a portion that is conductive and has a contact that is electrically connected to the developer layer thickness control member. When this process cartridge is mounted on the main body of the electrophotographic image forming apparatus, this contact is electrically connected to the main body contact of the main body, and a predetermined voltage can be applied to the developer layer thickness control member. A predetermined bias is applied to the developer carrying member 14, and an electrostatic latent image on the photosensitive member 19 is developed and visualized using the developer 16.

The developer supply roller 17 contacts the developer carrying member 14, penetrates thereinto by a predetermined penetration amount, and rotates in the same direction as the rotation direction of the developer carrying member 14. A bias of the same potential as the bias applied to the developer carrying member 14 is applied to the developer supply roller 17.

The developer layer thickness control member 15 has one end fixed to the developing device 18, and the other free end is arranged in contact with the developer carrying member 14 in the counter direction to the rotation direction thereof. The developer layer thickness control member 15 is arranged in contact with the developer carrying member 14 to control the amount of developer on the developer carrying member 14, making it a thin layer and forming a uniform developer layer thickness. Furthermore, a predetermined bias is applied to the developer layer thickness control member 15 to impart an electric charge to the developer 16.

Figure 4:
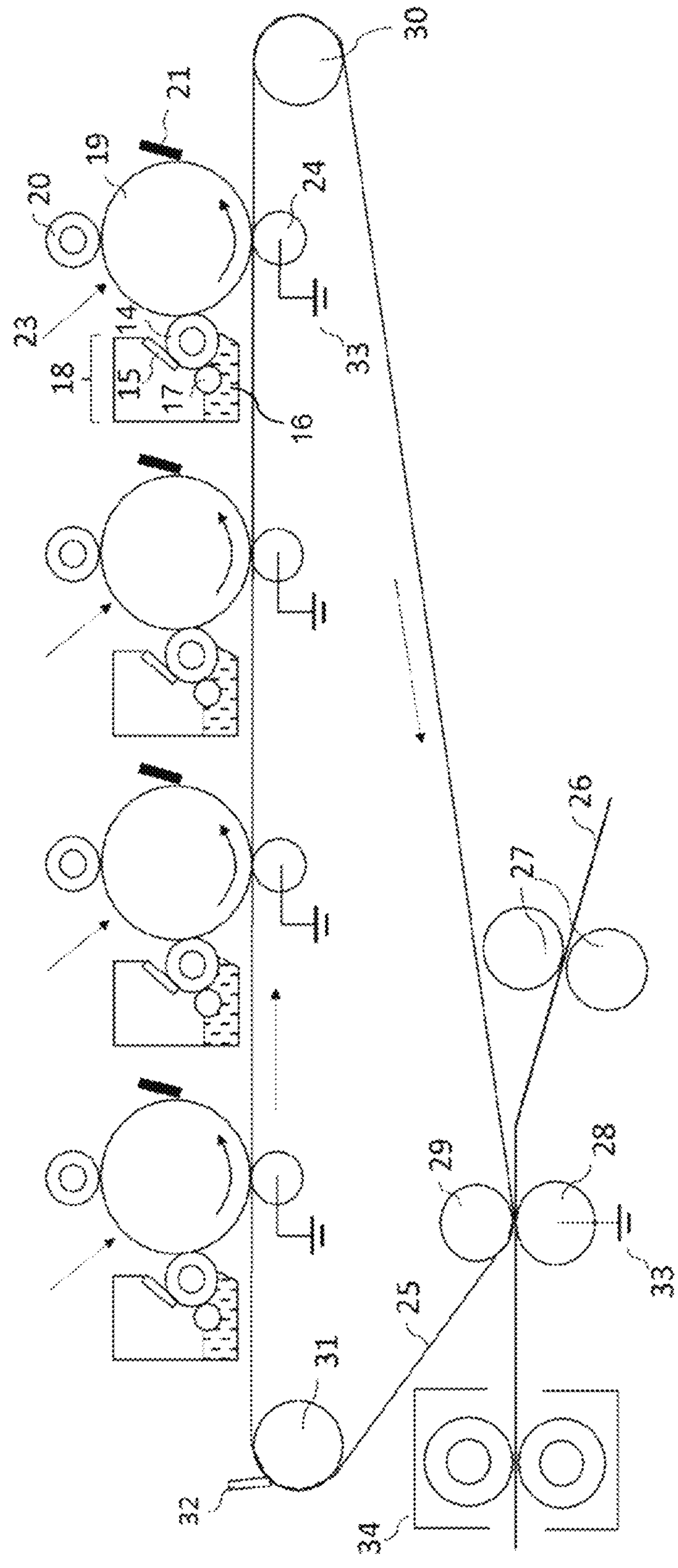
FIG. 4 is a schematic view of an electrophotographic image forming apparatus.

FIG. 4 is a schematic cross-sectional view showing an example of an electrophotographic image forming apparatus in which the developer carrying member is installed as a developer carrying member of a contact type developing device using a one-component developer. The developing device 18 comprises the developer 16 as the one-component developer, the developer carrying member 14, the developer supply roller 17 that supplies the developer to the developer carrying member 14, and the developer layer thickness control member 15 that controls the thickness of the developer layer on the developer carrying member 14. The developer carrying member 14 is located at an opening extending in the longitudinal direction within the developing device 18 and is arranged in contact with the photosensitive member 19. The photosensitive member 19, the charging roller 20, and the cleaning blade 21 may be provided in the main body of the electrophotographic image forming apparatus. The developing device 18 is equipped with black, cyan, magenta, and yellow color developers, enabling color printing.

The printing operation of the electrophotographic image forming apparatus will be described hereinbelow. The photosensitive member 19 rotates in the direction of the arrow, and is uniformly charged by the charging roller 20 for charging the photosensitive member 19. Next, an electrostatic latent image is formed on the surface of the photosensitive member 19 by a laser light 23, which is an exposure means. The electrostatic latent image is visualized (developed) as a developer image by the developing device 18 when the developer 16 is applied from the developer carrying member 14 that is arranged in contact with the photosensitive member 19. The development is a so-called reversal development in which a developer image is formed in the exposed portion.

The developer image formed on the photosensitive member 19 is transferred to an endless belt-like intermediate transfer body 25 by a transfer roller 24, which is a transfer member.

Paper 26, which is a recording medium, is fed into the device by a paper feed roller 27 and a secondary transfer roller 28, and is transported to a nip between a secondary transfer roller 28 and a driven roller 29 together with the intermediate transfer body 25 carrying the developer image, where the developer image is transferred to the paper 26. The intermediate transfer body 25 is driven by the driven roller 29, the drive roller 30, and the tension roller 31. The developer remaining on the intermediate transfer body 25 is cleaned by a cleaning device 32.

A voltage is applied from a bias power source 33 to the developer carrying member 14, the developer layer thickness control member 15, the transfer roller 24, and the secondary transfer roller 28. The paper 26 with the transferred developer image is subjected to fixing treatment by a fixing device 34 and discharged outside the device, completing the printing operation. Meanwhile, the untransferred developer remaining on the photosensitive member 19 without being transferred is scraped off by the cleaning blade 21, which is a cleaning member for cleaning the surface of the photosensitive member. The cleaned photosensitive member 19 repeats the above printing operation.

Impedance

In impedance measurement, the response of the developer carrying member is examined when DC voltage and AC voltage are applied while changing the frequency. The AC voltage is applied and the measurement is performed separately with respect to a response with no phase shift and a response with a phase shift of π/2 to the applied AC voltage. The measurement results are plotted as a complex plane with the impedance of the response with no phase shift as Z' (real part) and the impedance of the response with a phase shift as Z" (imaginary part), and the distance from the origin to the plot is calculated as the impedance value.

When the electrical characteristics of the developer carrying member are simulated by an RC parallel circuit, the real part with no phase shift represents the resistance component, and the imaginary part with a phase shift represents the capacitance component. The measurement conditions and the meaning of the measured values are omitted here, as they were explained in the previous section (2).

The impedance measurement method, measurement device, and measurement conditions are described below.

Method for Measuring Impedance

The impedance of the developer carrying member can be measured by the following methods (1) and (2).

(1) A method in which a thin-film electrode is provided on the surface of the developer carrying member, and measurement is performed using two terminals, one connected to the electrode and the other connected to the substrate.

(2) A method in which the developer carrying member is pressed against a metal drum with a constant load, and measurement is performed using two terminals, one connected to the metal drum and the other connected to the substrate.

While impedance can be measured by either method, the results obtained in method (2) are affected by the nip width and contact area between the developer carrying member and the metal drum, and therefore it is necessary to use a developer carrying member with the same hardness for measurement. For this reason, in the present disclosure, measurement is performed by method (1). The measurement method (1) is described below, but more specific conditions are described hereinbelow.

In order to eliminate the influence of the contact resistance between the developer carrying member and the measurement electrode when measuring the impedance, it is preferable to deposit a low-resistance thin film on the surface of the developer carrying member and measure the impedance with two terminals by using the thin film as an electrode and using a conductive substrate as a ground electrode.

Methods for forming the thin film include metal vapor deposition, sputtering, coating of metal paste, and application of metal tape. Among these, from the viewpoint of reducing the contact resistance with the developer carrying member, a method of forming a metal thin film such as platinum or palladium as an electrode by vapor deposition is preferable. In the present disclosure, vacuum platinum vapor deposition is adopted.

When forming a metal thin film on the surface of the developer carrying member, considering the simplicity of the process and uniformity of the thin film, it is preferable to provide a mechanism capable of clasping the developer carrying member to the vacuum vapor deposition device. In addition, for a developer carrying member with a cylindrical cross section, it is preferable to use a vacuum vapor deposition device further provided with a rotation mechanism.

It is preferable to perform the measurement by forming a thin metal film electrode with a width of about 10 mm in the longitudinal direction of the developer carrying member and connecting a metal sheet, which is wrapped around the thin metal film electrode in a direction intersecting the longitudinal direction without any gaps, to the measurement electrode protruding from the measurement device. In the case of a cylindrical developer carrying member, it is preferable to use a metal sheet wrapped around the circumferential direction of the developer carrying member without any gaps. This makes it possible to perform impedance measurement without being affected by the surface shape or the fluctuation of the size of the outer edge (outer diameter for a cylindrical developer carrying member) in the cross section perpendicular to the longitudinal direction of the developer carrying member. Aluminum foil, metal tape, and the like can be used as the metal sheet.

Impedance Measurement Conditions

The impedance measurement device may be an impedance analyzer, a network analyzer, a spectrum analyzer, and the like, as long as the device is capable of measuring the impedance in the frequency range from $1.0\times10^{-1}$ to $1.0\times10^{5}$ Hz. Among these, it is preferable to perform measurement using an impedance analyzer from the electrical resistance range of the developer carrying member.

The impedance measurement conditions are as follows. An impedance measuring device is used to measure the impedance in the frequency range of from $1.0\times10^{-1}$ to $1.0\times10^{5}$ Hz. The measurement environment is a temperature of 23° C. and a relative humidity of 50%. To take into account measurement variations, it is preferable to measure at least 9 points in total, 3 points along the length of the developer carrying member and 3 points in the rotational direction. The voltage application condition is a DC voltage of 50 V superimposed with an AC voltage of 50 V.

Surface Potential

A degree of excessive charging (charge-up of the developer) is evaluated in an environment with a temperature of 23° C. and a relative humidity of 50% by arranging a corona discharger having a grid portion with a width of 3.0 mm such that the distance between the grid portion and the outer surface of the developer carrying member is 1.0 mm and the width direction of the grid portion coincides with the axial direction of the developer carrying member, applying a voltage of 8 kV to the grid portion, moving the corona discharger along the axial direction of the developer carrying member relative thereto at a speed of 400 mm/sec to charge the outer surface of the developer carrying member, and measuring the potential of the outer surface 0.06 sec after passing the grid portion.

Figure 8:
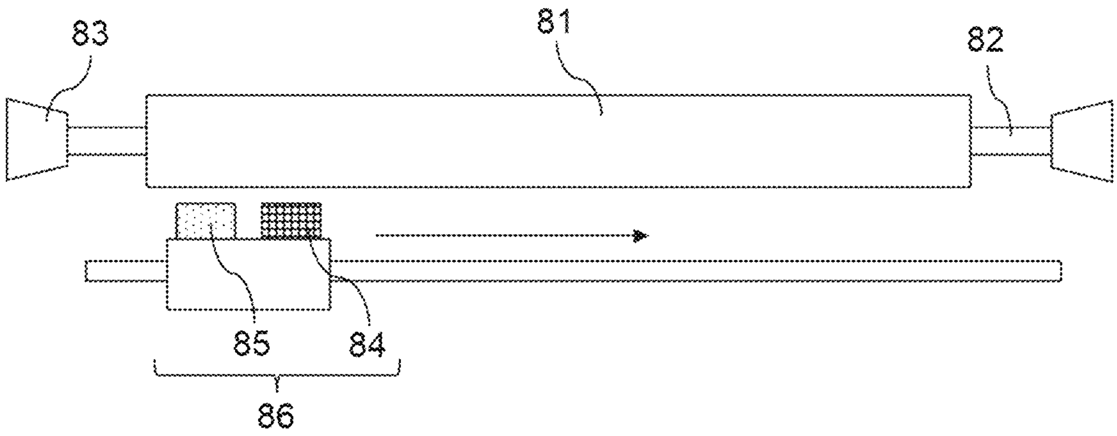
FIG. 8 is a schematic view showing an example of an apparatus for measuring the surface potential of a developer carrying member.

The surface potential of the developer carrying member can be measured, for example, by the device shown in FIG. 8. Both ends of a substrate 82 of a developer carrying member 81 are held by chucks 83, and a measuring unit 86 in which a corona discharger 84 and a surface electrometer 85 are arranged in parallel at a distance of 25 mm from each other is placed facing the surface of the developer carrying member 81 at a distance of 1.0 mm therefrom. In a stationary state of the developer carrying member 81, a voltage of 8 kV is applied to the grid portion of the corona discharger 84, the measuring unit 86 is moved in the axial direction of the developer carrying member 81 at a speed of 400 mm/sec, and the surface potential 0.06 sec after passing the corona discharger 84 is measured by the surface electrometer 85.

Ionization Potential

The ionization potential is measured by the following measurement method. The ionization potential is a numerical value expressed as the energy (eV) required to remove electrons from a substance. The ionization potential is measured using a surface analyzer (product name: AC-5, manufactured by Riken Keiki Co., Ltd.). This device uses a deuterium lamp and performs measurements under the following conditions:

Irradiation light quantity: 800 nW

Spectrometer: grating type monochromator

Spot size: 2 [mm]×4 [mm]

Energy scanning range: 4.0 to 6.2 [eV]

Measurement time: 5 [sec/1 energy]

Photoelectrons emitted from the sample surface are detected and processed using the ionization potential calculation software built into the surface analysis device.

In the surface analysis, where the excitation energy of monochromatic light is scanned from low to high at intervals of 0.05 eV, photon emission begins at a certain energy value [eV], and this energy threshold is taken as the ionization potential [eV].

Figure 11:
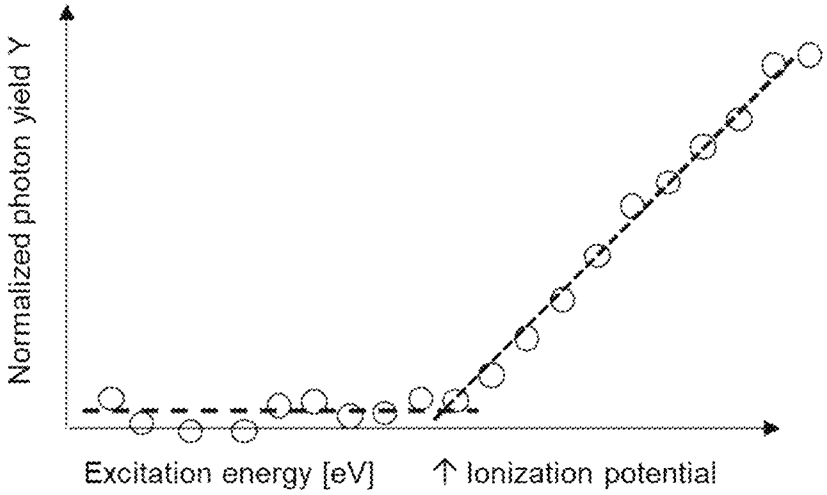
FIG. 11 is an example of results obtained by ionization potential measurement.

An example of the measurement curve of the work function obtained by measurement under the above conditions is shown in FIG. 11. In FIG. 11, the horizontal axis indicates the excitation energy [eV], and the vertical axis indicates the value Y of the number of emitted photoelectrons to the power of 0.5 (normalized photon yield). Generally, when the excitation energy value exceeds a certain threshold, photoelectrons are suddenly emitted. In other words, the normalized quantum yield increases. The value of the excitation energy required when the normalized quantum yield starts to increase is defined as the ionization potential.

Method for Measuring Elastic Modulus

The elastic modulus is measured using a scanning probe microscope (SPM).

First, a region including a cross section of the resin layer in the thickness direction from the developer carrying member is cut with a cryomicrotome (product name: EMFC6, manufactured by Leica Microsystems GmbH) into a thin piece using a diamond knife while keeping the temperature at −110° C. Furthermore, a 100-μm square sample with a width of 100 μm in the depth direction is prepared from the thin piece.

Figure 12:
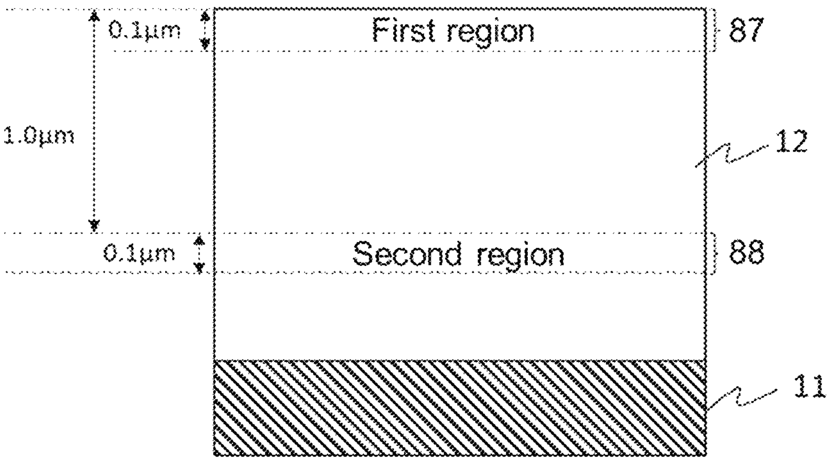
FIG. 12 is a cross-sectional view of a developer carrying member.

Here, FIG. 12 is a schematic cross-sectional view of the resin layer 12 formed on the conductive substrate 11. In the present disclosure, as shown in FIG. 12, a region from the outer surface of the resin layer 12 forming the outer surface of the developer carrying member to a depth of 0.1 μm is defined as a first region 87, and a region from the outer surface to a depth of 1.0 to 1.1 μm is defined as a second region 88.

The elastic modulus is measured in each region that appears on the cross section of the prepared sample. For the measurement, an SPM device (product name: MFP-3D-Origin, manufactured by Oxford Instruments plc) and a probe (product name: AC160, manufactured by Olympus Corporation) are used. At this time, after first acquiring a 5-μm square shape image, the force curve is measured 10 times in each of the first region 87 and the second region 88 other than the coarseness forming particles and carbon black, the arithmetic average of 8 points excluding the maximum and minimum values is obtained, and the elastic modulus can be calculated by Hertz theory. The elastic modulus in the first region 87 and the second region 88 is defined as E1 and E2, respectively.

The meaning of E1 in the first region is as described above. E2 in the second region is the elastic modulus at a depth of from 1.0 to 1.1 μm from the outer surface, and the elastic modulus E2 is preferably from 1 to 100 MPa. When E2 in the second region is within the above-mentioned range, deterioration of the developer in the durability evaluation can be suppressed, and high-quality images can be provided throughout the durability.

Verification of IPN Structure

The IPN structure is verified by microsampling mass spectrometry. Microsampling mass spectrometry uses an ion trap mass spectrometer. A sample is fixed to a filament located at the tip of a probe and directly inserted into the ionization chamber. It is then rapidly heated from room temperature to a temperature of 1000° C. at a constant heating rate. The sample decomposed and evaporated by heating is ionized by irradiation with an electron beam and detected by a mass spectrometer.

At this time, under conditions of a constant heating rate, a thermal chromatogram similar to the TG-MS (thermogravimetry-mass spectrometry analysis) method is obtained, which has a mass spectrum called a total ion chromatogram (TIC). In addition, since a thermal chromatogram for a fragment of a predetermined mass can be obtained, it is possible to obtain a peak temperature of the thermal chromatogram that corresponds to the decomposition temperature of a desired molecular structure. The peak temperature of the thermal chromatogram is correlated with the crosslinked structure in the resin structure, and as the crosslinking becomes denser, the peak temperature shifts to a high-temperature side. In other words, compared to the crosslinked acrylic resin alone, the peak temperature of the thermal chromatogram is higher in a portion where the crosslinked urethane resin and the crosslinked acrylic resin form an IPN structure.

A peak top temperature A1 of a thermal chromatogram derived from the crosslinked acrylic resin is obtained from a first sample obtained from the first region, which is a region to a depth of 0.1 μm from the outer surface of the resin layer. Furthermore, a peak top temperature A2 of a thermal chromatogram derived from the crosslinked acrylic resin measured from a second sample obtained by decomposing the crosslinked urethane resin comprised in the first sample is obtained. When an IPN structure is formed, A1 is higher than A2 in terms of the peak temperature of the thermal chromatogram.

A2 is a value obtained by performing microsampling mass spectrometry on the second sample obtained after decomposing the crosslinked urethane by the pyridine decomposition method described hereinbelow.

A1 can be, for example, 390 to 398° C. and 393 to 397° C. A2 can be, for example, 385 to 395° C. and 390 to 394° C.

Pyridine Decomposition Method

The pyridine decomposition method is a method for selectively decomposing urethane bonds. By performing the pyridine decomposition method on a sample having an IPN structure of crosslinked acrylic resin and crosslinked urethane resin, it is possible to obtain crosslinked acrylic resin after removing the structure derived from the crosslinked urethane. The presence or absence of an IPN structure can be confirmed by capturing the change in peak temperature of the thermal chromatogram of this crosslinked acrylic resin. Specifically, the pyridine decomposition method is performed as follows.

Using a microtome, a sample is cut out from the outer surface of the resin layer of the developer carrying member to a thickness of 0.1 μm, and 500 mg of the sample is collected. A total of 0.5 mL of a mixture of pyridine (manufactured by Wako Pure Chemical Industries, Ltd.) and water in a ratio of 3:1 is added to the obtained sample, and the sample is decomposed by heating at 130° C. for 15 h in a closed container made of fluororesin (Teflon (registered trademark)) with a stainless steel jacket. The pyridine is removed by reducing the pressure of the decomposition product obtained. The above-described microsampling mass spectrometry is performed using the sample obtained in this manner to obtain the value of A2.

Structural Analysis of Crosslinked Acrylic Resin

The presence of silicone groups and/or fluorine groups in the crosslinked acrylic resin molecule can be analyzed by known means such as pyrolysis GC/MS (gas chromatograph mass spectrometer), FT-IR (Fourier transform infrared spectrophotometer), and NMR (nuclear magnetic resonance device).

The structure derived from the crosslinked urethane was removed by the pyridine method, and the resulting crosslinked acrylic resin was confirmed using FT-IR (product name: FT/IR-4700, manufactured by JASCO Corporation, FT-IR).

EXAMPLES

The present disclosure will be described in more detail below with reference to examples, but these are not intended to limit the present disclosure in any way.

1. Preparation and Production of Raw Materials for Forming Resin Layer 1-1. Preparation and Production Example of Raw Material Polyol Below is a synthesis example for obtaining a polyurethane resin layer.

Measurement of Number-Average Molecular Weight of Raw Material Polyol

The device and conditions used for measuring the number-average molecular weight (Mn) in this production example are as follows.

- Measuring device: HLC-8120GPC (manufactured by Tosoh Corporation)
- Column: TSKgel Super HZMM (manufactured by Tosoh Corporation)×2
- Solvent: tetrahydrofuran (THF) (20 mmol/l, triethylamine added)
- Temperature: 40° C.
- Flow rate of THF: 0.6 ml/min The measurement sample was a 0.1% by mass THE solution. Furthermore, an RI (refractive index) detector was used as the detector for the measurement.

A calibration curve was created using TSK standard polystyrenes A-1000, A-2500, A-5000, F-1, F-2, F-4, F-10, F-20, F-40, F-80, and F-128 (manufactured by Tosoh Corporation) as standard samples for creating the calibration curve. Based on this calibration curve, the number-average molecular weight was calculated from the retention time of the obtained measurement sample.

Raw Material Polyol

Raw material polyols A-1 to A-5 were prepared.

The details are listed in Table 1.

TABLE 1

| No. | Raw material polyol |
|---|---|
| A-1 | Duranol T5652 Mn = 2000 (manufactured by Asahi Kasei Chemicals Corp.) |
| A-2 | Duranol G3452 Mn = 2000 (manufactured by Asahi Kasei Chemicals Corp.) |
| A-3 | ETERNACOLL UH-200 Mn = 2000 (manufactured by Ube Industries, Ltd.) |
| A-4 | Nippolan 982 Mn = 2000 (manufactured by Ube Industries, Ltd.) |
| A-5 | ETERNACOLL UM(1:3) Mn = 900 (manufactured by Ube Industries, Ltd.) |

1-2. Preparation of Raw Material Isocyanates B-1 to B-3

Raw material isocyanates B1 to B3 were prepared.

The details are listed in Table 2.

TABLE 2

| No. | Raw material isocyanate |
|---|---|
| B-1 | Diphenylmethane diisocyanate (MDI) (product name: Millionate MT, manufactured by Tosoh Corporation) |
| B-2 | Polymethylene polyphenyl polyisocyanate (polymeric MDI) (product name: Millionate MR200, manufactured by Tosoh Corporation) |
| B-3 | Isocyanurate trimer of hexamethylene diisocyanate (product name: Duranate TPA-100, manufactured by Asahi Kasei Chemicals Corp.) |

1-3. Production Example of Hydroxyl-Terminated Urethane Prepolymers C-1 to C-3

Synthesis of Hydroxyl-Terminated Urethane Prepolymer C-1

The materials listed in Table 3 below were reacted at 90° C. for 3 h under heating and stirring in a nitrogen atmosphere. Then, 2-butanone (MEK) was added to the resulting reaction product to obtain a solution with a solid fraction content of 50 parts by mass, thereby producing hydroxyl-terminated urethane prepolymer C-1.

Synthesis of Hydroxyl-Terminated Urethane Prepolymers C-2 and C-3

Hydroxyl-terminated urethane prepolymers C-2 and C-3 were produced using the raw materials listed in Table 3 below in the same manner as in the synthesis of hydroxyl-terminated urethane prepolymer C-1.

The chemical structures of these hydroxyl-terminated urethane prepolymers C-1 to C-3 were identified using $^1H$-NMR and $^{13}C$-NMR. In Table 3, m, n, o, p, q, r, and s in structural formulas (1), (2), (3), and (4) are the average number of moles added.

TABLE 3

| Hydroxyl-terminated urethane | Raw material polyol | | Raw material isocyanate | | | | | |
|---|---|---|---|---|---|---|---|---|
| prepolymer No. | No. | Parts by mass | No. | Parts by mass | Structure comprised in molecule | | | |
| C-1 | A-1 | 100 | B-1 | 6.3 | Structural formula (1) | $R11 = (CH_2)_5$ | $R12 = (CH_2)_6$ | m, n = 6.9 |
| C-2 | A-2 | 100 | B-1 | 6.3 | Structural formula (1) | $R11 = (CH_2)_3$ | $R12 = (CH_2)_4$ | m, n = 8.8 |
| C-3 | A-3 | 100 | B-1 | 6.3 | Structural formula (4) | $R41 = (CH_2)_6$ | | s = 13.2 |

For hydroxyl-terminated urethane prepolymers C-1 and C-2, which comprise the structure shown in structural formula (1) in molecules thereof, R13 in structural formula (1) was the same as R12.

In the table, the description "x, y=A", such as m and n=6.9, indicates that the average number of moles added of x and y is A. The same applies to the following tables.

1-4. Production Example of Isocyanate-Terminated Prepolymers D-1 to D-3 Synthesis of Isocyanate-Terminated Prepolymer D-1

The materials listed in Table 4 below were reacted at 90° C. for 3 h under heating and stirring in a nitrogen atmosphere. Then, 2-butanone (MEK) was added to the resulting reaction product to obtain a solution with a solid fraction content of 50 parts by mass, thereby producing isocyanate-terminated urethane prepolymer D-1.

Synthesis of Isocyanate-Terminated Prepolymers D-2 and D-3

Isocyanate-terminated prepolymers D-2 and D-3 were produced in the same manner as in the synthesis of isocyanate-terminated prepolymer D-1 by using the types and amounts of raw materials listed in Table 4 below.

The chemical structures of these isocyanate-terminated prepolymers D-1 to D-3 were identified using $^1$H-NMR and $^{13}$C-NMR. In Table 7, m, n, o, p, q, r, and s in structural formulas (1), (2), (3), and (4) are the average number of moles added.

TABLE 4

| Isocyanate-terminated urethane | Raw material polyol | | Raw material isocyanate | | | | | |
|---|---|---|---|---|---|---|---|---|
| prepolymer No. | No. | Parts by mass | No. | Parts by mass | Structure comprised in molecule | | | |
| D-1 | A-4 | 100 | B-2 | 33.5 | Structure formula (2) | o = 9.1, p = 5.5 | | |
| D-2 | A-5 | 100 | B-3 | 78.4 | Structure formula (1) | $R11 = (CH_2)_6$ | $R12 = CH_2—CH<\begin{matrix}(CH_2)_2\\(CH_2)_2\end{matrix}>CH—CH_2$ | m = 4.1, n = 1.4 |
| D-3 | A-3 | 100 | B-2 | 33.5 | Structure formula (4) | $R41 = (CH_2)_6$ | | s = 13.2 |

For isocyanate-terminated prepolymer D-2, which comprises the structure shown in structural formula (1) in the molecule thereof, R13 in structural formula (1) is the same as at least one selected from the group consisting of R11 and R12.

2. Resin Layer, Preparation of Additive Raw Materials 2-1. Preparation of Polyoxyethylene Polyoxypropylene Alkyl Ether Preparation of Polyoxyethylene Polyoxypropylene Alkyl Ether Details relating to polyoxyethylene polyoxypropylene alkyl ethers E-1 to E-3 are listed in Table 5.

TABLE 5

| No. | Material | Structure | | |
|---|---|---|---|---|
| E-1 | Polyoxyethylene polyoxypropylene butyl ether (product name: Unilube 50 MB-26, manufactured by Nippon Oil & Fats Co., Ltd.) | Structural formula (5) | $R51 = C_4H_9$ | t, u = 17 |
| E-2 | Polyoxyethylene polyoxypropylene butyl ether (product name: Unilube 50 MB-11, manufactured by Nippon Oil & Fats Co., Ltd.) | Structural formula (5) | $R51 = C_4H_9$ | t = 9, u = 10 |
| E-3 | Polyoxyethylene methyl ether acetate | Structural formula (7) | $R71 = CH_3$ | x = 11 |

Surface Modifier

The materials used as surface modifiers are listed in Table 6.

TABLE 6

| No. | Surface modifier |
|---|---|
| H-1 | Silicone hexaacrylate (product name: EBECRYL 1360, manufactured by Daicel-Allnex Co., Ltd.) |
| H-2 | Fluorine-modified acrylate (product name: EBECRYL 8110, manufactured by Daicel-Allnex Co., Ltd.) |
| H-3 | Octafluoropentyl methacrylate (product name: Viscoat 8FM, manufactured by Osaka Organic Chemical Industry Ltd.) |
| H-4 | Aminoacrylate (product name: EBECRYL 7100, manufactured by Dainichiseika Color & Chemicals Mfg. Co., Ltd.) |

Impregnation Treatment Liquid

The materials shown in Table 7 below were dissolved and mixed as the materials for the impregnation treatment liquid for the impregnation treatment.

TABLE 7

| | | Impregnation treatment liquid No. | |
|---|---|---|---|
| Type | Material name | J-1 | J-2 |
| Acrylic monomer | Bifunctional acrylic monomer (product name: EBECRYL 145, manufactured by Daicel-Allnex Co., Ltd.) | 5 | — |
| | Trifunctional acrylic monomer (product name: pentaerythtritol triacrylate, manufactured by Shin-Nakamura Chemical Co., Ltd.) | — | 1 |
| Photopolymerization initiator | Omnirad 184 (IGM Resins B.V.) | 0.25 | 0.25 |
| Solvent | Methyl ethyl ketone | 100 | 100 |

TABLE 8-continued

| Material | Parts by mass |
|---|---|
| Platinum catalyst (product name: SIP6830.3, manufactured by GELEST, Inc.) | 0.01 |

The mold was then heated at 150° C. for 15 min to vulcanize and cure the silicone rubber, and after demolding, the silicone rubber was heated at 180° C. for 1 h to complete the curing reaction, resulting in an elastic roller with an elastic layer of 11.5 mm in diameter on the outer periphery of the substrate.

3-3. Preparation of Coating Material Liquid for Forming Resin Layer

The materials of the types and amounts shown in Table 9 below were added as the materials for a coating material liquid for forming the resin layer to a reaction vessel and stirred. Next, 2-butanone (MEK) was added so that the total solid fraction ratio was 30% by mass, and the components were mixed with a sand mill.

3. Production Example of Developer Carrying Member

In this example, a developer carrying member in which a resin layer is coated on an elastic roller having an elastic layer on the outer surface of a substrate is described, but the present disclosure is not limited to this configuration.

3-1. Preparation of Substrate

The substrate was prepared by coating a primer (product name: DY35-051, manufactured by Dow Toray Co., Ltd.) on the peripheral surface of a 6-mm diameter core bar made of stainless steel (SUS304) and baking (130° C., 5 min).

3-2. Preparation of Elastic Layer

The substrate was placed in a mold, and an addition-type silicone rubber composition comprising the materials shown in Table 8 was poured into the cavity formed in the mold.

TABLE 8

| Material | Parts by mass |
|---|---|
| Liquid silicone rubber (product name: SE6724A/B, manufactured by Dow Toray Co., Ltd.) | 100 |
| Carbon black (product name Toka Black #4300, manufactured by Tokai Carbon Co., Ltd.) | 16 |
| Curing control agent (product name: 1-ethyny1-1-cyclohexanol, manufactured by Tokyo Kasei Kogyo Co., Ltd.) | 0.01 |

Next, 2-butanone (MEK) was added to adjust the viscosity of the liquid to within the range of from 6 to 10 mPa·s to prepare a coating material for forming a resin layer.

TABLE 9

| Material | Parts by mass |
|---|---|
| Hydroxyl-terminated urethane prepolymer C-1 | 100 |
| Isocyanate-terminated urethane prepolymer D-1 | 54.7 |
| Additive E-1 | 7 |
| Surface modifier H-1 | 4.9 |
| Carbon black (product name: MA8, manufactured by Mitsubishi Chemicals Corporation) | 35 |
| Coarseness-forming particles (product name: Art Pearl C-400T, manufactured by Negami Chemical Industrial Co., Ltd.) | 23 |

3-4. Preparation of Crosslinked Urethane Resin in Resin Layer

The elastic roller was oriented so that the lengthwise direction thereof was along the vertical direction, the upper end thereof was gripped and the elastic roller was immersed (dipped) into the coating material liquid for forming the resin layer to coat the surface of the elastic roller with the coating material liquid. The resulting coating was air-dried at room temperature for 30 min, and then dried for 1 h in a hot air circulation dryer set at 160° C. In this way, an elastic roller was obtained in which a crosslinked urethane resin in a resin layer with a thickness of 12 μm was formed on the elastic layer.

3-5. Impregnation Treatment

Then, impregnation and curing treatment of an acrylic monomer capable of forming a crosslinked acrylic resin was performed by the following method. The impregnation treatment liquids shown in Tables 7 and 10 were used for the impregnation treatment. The elastic roller on which the crosslinked urethane resin had been formed was immersed in the above-mentioned impregnation treatment liquid for 2 sec to be impregnated with the acrylic monomer component. After that, it was immediately dried at 90° C. for 1 h to volatilize the solvent. After drying, the elastic roller was rotated and irradiated with ultraviolet light so that the cumulative light quantity was 15,000 mJ/cm$^2$ to cure the acrylic monomer and obtain a developer carrying member 1 in which an IPN structure was formed.

A high-pressure mercury lamp (product name: Handy Type UV Curing Device, manufactured by Marionetwork Co., Ltd.) was used as the ultraviolet irradiation device.

The physical properties of the obtained developer carrying member 1 are listed in Tables 10-1 and 10-2.

Manufacture of Developer Carrying Members 2 to 11

Developer carrying members 2 to 11 were manufactured in the same manner as the developer carrying member 1, except that the materials and number of parts were changed to those listed in Table 10-1. The physical properties of the obtained developer carrying members 2 to 11 are listed in Tables 10-1 and 10-2.

When the presence/absence of step in the impregnation liquid column is described as "Present", the above-mentioned impregnation treatment was performed. Conversely, when the description is "Absent", the impregnation treatment was not performed.

TABLE 10-1

| Developer carrying member No. | Hydroxyl-terminated urethane prepolymer No. | Parts by mass | Isocyanate-terminated urethane prepolymer No. | Parts by mass | Polyoxyethylene polypropylene alkyl ether No. | Parts by mass | Surface modifier No. | Parts by mass | Impregnation treatment liquid Presence/absence of step | No. | Impedance [Ω] | Surface potential [V] | Ionization potential [eV] |
|---|---|---|---|---|---|---|---|---|---|---|---|---|---|
| 1 | C-1 | 100 | D-1 | 54.7 | E-1 | 7 | H-1 | 4.9 | Present | J-1 | 9.12E+06 | 5.7 | 5.5 |
| 2 | C-1 | 100 | D-1 | 54.7 | E-1 | 7 | H-4 | 4.9 | Present | J-1 | 9.12E+06 | 5.7 | 4.6 |
| 3 | C-1 | 100 | D-1 | 54.7 | E-1 | 7 | H-1 | 4.9 | Present | J-2 | 9.12E+06 | 5.7 | 5.5 |
| 4 | C-1 | 100 | D-1 | 54.7 | E-1 | 7 | H-3 | 4.9 | Present | J-1 | 9.12E+06 | 5.7 | 5.2 |
| 5 | C-1 | 100 | D-1 | 54.7 | E-1 | 7 | H-3 | 1.6 | Present | J-2 | 9.12E+06 | 5.7 | 5.3 |
| 6 | C-1 | 100 | D-2 | 54.7 | E-2 | 7 | H-1 | 4.9 | Absent | — | 2.15E+08 | 3.8 | 5.5 |
| 7 | C-1 | 100 | D-2 | 54.7 | E-3 | 7 | H-1 | 4.9 | Absent | — | 2.27E+06 | 3.8 | 5.5 |
| 8 | C-2 | 100 | D-1 | 54.7 | E-1 | 7 | H-1 | 4.9 | Absent | — | 1.52E+06 | 3.2 | 5.5 |
| 9 | C-2 | 100 | D-1 | 54.7 | E-1 | 7 | — | — | Absent | — | 1.52E+06 | 3.2 | 4.6 |
| 10 | C-2 | 100 | D-1 | 54.7 | E-1 | 7 | H-4 | 7.5 | Absent | — | 1.52E+06 | 3.2 | 4.3 |
| 11 | C-3 | 100 | D-3 | 54.7 | E-1 | 7 | H-1 | 4 | Absent | — | 7.41E+06 | 14.2 | 5.5 |
| 12 | Explained in separate table | | | | | | | | | | 3.96E+05 | 3.7 | 5.5 |
| 13 | Explained in separate table | | | | | | | | | | 2.00E+08 | 462 | 5.5 |
| 14 | Explained in separate table | | | | | | | | | | 1.50E+05 | 980 | 5.6 |

TABLE 10-2

| Developer carrying member No. | Comprising of polycarbonate structure | Rc [nm] | σc | σc/Rc | d [nm] | σd | σd/d | E1 [Mpa] | E2 [Mpa] | A1 | A2 |
|---|---|---|---|---|---|---|---|---|---|---|---|
| 1 | Comprised | 55.2 | 33.1 | 0.600 | 111.6 | 64.1 | 0.574 | 350 | 40 | 395 | 392 |
| 2 | Comprised | 55.2 | 33.1 | 0.600 | 111.6 | 64.1 | 0.574 | 350 | 40 | 395 | 392 |
| 3 | Comprised | 55.2 | 33.1 | 0.600 | 111.6 | 64.1 | 0.574 | 500 | 100 | 395 | 392 |
| 4 | Comprised | 55.2 | 33.1 | 0.600 | 111.6 | 64.1 | 0.574 | 400 | 130 | 395 | 392 |
| 5 | Comprised | 55.2 | 33.1 | 0.600 | 111.6 | 64.1 | 0.574 | 200 | 10 | 394 | 392 |
| 6 | Comprised | 58.9 | 37.0 | 0.628 | 143.5 | 83.2 | 0.580 | 20 | 20 | 392 | 392 |
| 7 | Comprised | 57.9 | 37.2 | 0.642 | 127.5 | 74.1 | 0.581 | 20 | 20 | 392 | 392 |
| 8 | Comprised | 59.2 | 38.0 | 0.642 | 103.8 | 57.2 | 0.551 | 20 | 20 | 392 | 392 |
| 9 | Comprised | 59.2 | 38.0 | 0.642 | 103.8 | 57.2 | 0.551 | 20 | 20 | 392 | 392 |
| 10 | Comprised | 59.2 | 38.0 | 0.642 | 103.8 | 57.2 | 0.551 | 20 | 20 | 392 | 392 |
| 11 | Comprised | 52.1 | 31.1 | 0.597 | 102.3 | 57.2 | 0.559 | 20 | 20 | 392 | 392 |
| 12 | Not comprised | 92.9 | 60.7 | 0.653 | 146.8 | 95.6 | 0.651 | 20 | 20 | 392 | 392 |
| 13 | Not comprised | 57.0 | 34.0 | 0.596 | 112.7 | 63.8 | 0.565 | 20 | 20 | 392 | 392 |
| 14 | Not comprised | — | — | — | — | — | — | 35 | 35 | 393 | 393 |

In the table, for example, a description such as "9.12E+06" indicates "$9.12\times10^{6}$". A1 is the above-mentioned peak top temperature A1 (° C.), and A2 is the above-mentioned peak top temperature A2 (° C.).

The IPN structure consisting of crosslinked urethane resin and crosslinked acrylic resin was confirmed in the developer carrying members 1 to 5, but the IPN structure was not confirmed in other developer carrying members.

Production of Developer Carrying Member 12

The materials of the types and amounts shown in Table 11 below were added to a reaction vessel and stirred. Next, 2-butanone (MEK) was added so that the total solid fraction ratio was 30% by mass, and the components were mixed with a sand mill. Next, 2-butanone (MEK) was added to adjust the viscosity of the liquid to within the range of from 6 to 10 mPa·s to prepare a coating material for forming a resin layer.

The elastic roller obtained in the production of the developer carrying member 1 was oriented so that the lengthwise direction thereof was along the vertical direction, the upper end thereof was gripped and the elastic roller was immersed (dipped) into the coating material liquid for forming the resin layer to coat the surface of the elastic roller with the coating material liquid. The resulting coating was air-dried at room temperature for 30 min, and then dried for 1 h in a hot air circulation dryer set at 160° C. In this way, a resin layer was formed on the elastic roller having a resin layer with a thickness of 12 μm formed on the elastic layer, and developer carrying member 12 was obtained.

The physical properties of the developer carrying member 12 are shown in Tables 10-1 and 10-2.

TABLE 11

| Material | Parts by mass |
|---|---|
| Polytetramethylene glycol ether polyol (product name: PTG1000SN, manufactured by Hodogaya Chemical Co., Ltd.) | 25 |
| Polycarbonate polyol (product name: T5651, manufactured by Asahi Kasei Chemicals Corporation) | 75 |
| Isocyanate (product name: Coronate HX, manufactured by Tosoh Corporation) | 55.5 |
| Carbon black (product name: MA8, manufactured by Mitsubishi Chemicals Corporation) | 30 |
| Coarseness-forming particles (product name: Art Pearl C-400T. manufactured by Negami Chemical Industrial Co., Ltd.) | 20 |

Production of Developer Carrying Member 13

A developer carrying member 13 was produced in the same manner as in the production of the developer carrying member 1, except that the additive E-1 was changed to 14 parts of a silane coupling agent (product name: A-187, manufactured by Momentive Corp.), and the impregnation process was not performed. The physical properties of the developer carrying member 13 are shown in Tables 10-1 and 10-2.

Production of Developer Carrying Member 14

The mold used in the production of the elastic roller described above was coated in advance with a fluorine-based release agent (product name: Frelease 310, manufactured by Neos Co., Ltd.) as the release agent, and a liquid of a foaming material in which the following materials (A) to (F) were blended and dispersed was poured into the mold.

(A): polyol A (polyethylene propylene ether triol with a number-average molecular weight of 3100, product name: Actcol EP-550N; manufactured by Mitsui Chemicals SKC Polyurethanes Inc.): 100.0 parts by mass.

(B): polyisocyanate mixture (NCO %=45, comprises 20% MDI, product name: Cosmonate TM-20; manufactured by Mitsui Chemicals SKC Polyurethanes Inc.): 23.9 parts by mass.

(C): silicone foam stabilizer (product name: SRX274C, manufactured by Toray Industries, Inc.): 1.0 part by mass.

(D): tertiary amine catalyst A (mixture of bis(2-dimethylaminoethyl) ether and dipropylene glycol, trade name: TOYOCAT-ET, manufactured by Tosoh Corporation): 0.3 parts by mass.

(E): amine catalyst B (trade name: TOYOCAT-L33, manufactured by Tosoh Corporation): 0.2 parts by mass.

(F): foaming agent (water): 1.4 parts by mass.

After the foaming material was injected, heating was performed at 75° C. for 7 min, followed by demolding.

By the above method, an elastic roller with an elastic layer comprising a foamed urethane resin was produced.

This elastic roller was coated with a PTFE coating material (polytetrafluoroethylene). In this way, a developer carrying member 14 was obtained in which the surface of the porous body was coated with Teflon resin. The physical properties of the developer carrying member 14 are shown in Tables 10-1 and 10-2.

4. Production Example of Developer

Production of Treated Magnetic Body

A caustic soda solution in an amount of 1.00 to 1.10 equivalents with respect to iron element, $P_2O_5$ in an amount of 0.15% by mass in terms of phosphorus element with respect to iron element, and $SiO_2$ in an amount of 0.50% by mass in terms of silicon element with respect to iron element were mixed in an aqueous solution of ferrous sulfate to prepare an aqueous solution comprising ferrous hydroxide. The pH of the aqueous solution was set to 8.0, and an oxidation reaction was carried out at 85° C. while blowing air into the solution to prepare a slurry liquid comprising seed crystals.

Next, an aqueous solution of ferrous sulfate was added to this slurry liquid so that the amount was 0.90 to 1.20 equivalents with respect to the initial amount of alkali (sodium component of caustic soda), the pH of the slurry liquid was maintained at 7.6, and the oxidation reaction was carried out while blowing air into the slurry liquid to obtain a slurry liquid comprising magnetic iron oxide. After filtering and washing, water-comprising slurry liquid was for the time being removed. At this time, a small amount of the water-comprising sample was taken and the water content was measured. Next, this water-comprising sample was put into another aqueous medium without drying, and redispersed in a pin mill while stirring and circulating the slurry, and the pH of the redispersion liquid was adjusted to about 4.8. Then, 1.6 parts of n-hexyltrimethoxysilane (the amount of magnetic iron oxide was calculated as the value obtained by subtracting the water content from the water-comprising sample) was added to 100 parts of magnetic iron oxide while stirring, and hydrolysis was performed. After that, thorough stirring was performed, the pH of the dispersion liquid was adjusted to 8.6 and surface treatment was performed. The generated hydrophobic magnetic material was filtered with a filter press, washed with a large amount of water, and then dried at 100° C. for 15 min and at 90° C. for 30 min, and the resulting particles were crushed to obtain a treated magnetic material with a number-average particle diameter of 0.21 μm.

Production of Amorphous Polyester

The raw material monomers were prepared as shown below and placed in a reaction vessel equipped with a nitrogen introduction tube, a dehydration tube, a stirrer, and a thermocouple, and 1.5 parts of dibutyltin were added as a catalyst for 100 parts of the monomers. The temperature was then quickly raised to 180° C. under normal pressure in a nitrogen atmosphere, and the water was distilled off while heating from 180° C. to 210° C. at a rate of 10° C./h to carry out polycondensation.

After reaching 210° C., the pressure inside the reaction vessel was reduced to 5 kPa or less, and polycondensation was carried out under conditions of 210° C. and 5 kPa or less to obtain an amorphous polyester. The number-average molecular weight of the obtained amorphous polyester was 7800 and the glass transition temperature was 73° C.

| | |
|---|---|
| Bisphenol A (propylene oxide 2 mol adduct) | 90.0 parts |
| Terephthalic acid | 74.0 parts |
| Trimellitic anhydride | 4.0 parts |

Production Example of Developer Particles

A total of 450 parts of 0.1 mol/L-$Na_3PO_4$ aqueous solution was added to 720 parts of ion-exchanged water and heated to 60° C., and then 67.7 parts of 1.0 mol/L-$CaCl_2$) aqueous solution was added to obtain an aqueous medium comprising a dispersion stabilizer.

| | |
|---|---|
| Styrene | 75.0 parts |
| n-Butyl acrylate | 25.0 parts |
| Amorphous polyester | |
| Divinylbenzene | 0.6 parts |
| The above-mentioned treated magnetic material | 65.0 parts |

The above formulation was dispersed and mixed using an attritor (Mitsui Miike Chemical Engineering Co., Ltd.) to obtain a monomer composition. This monomer composition was heated to 63° C., and 5.0 parts of ester wax (melting point 70° C.) were added, mixed, and dissolved. Then, 6.0 parts of tert-butyl peroxypivalate was dissolved as a polymerization initiator.

The monomer composition was added to the aqueous medium and granulation was performed by stirring at 12,000 rpm for 10 min in a $N_2$ atmosphere at 60° C. by using a TK homomixer (Tokushu Kika Kogyo Co., Ltd.). Then, a reaction was conducted at 70° C. for 4 h while stirring with a paddle impeller. After the reaction was completed, it was confirmed that colored particles were dispersed in the aqueous medium thus obtained, and that calcium phosphate was attached as an inorganic dispersing agent to the surface of the colored particles.

Then, hydrochloric acid was added to the aqueous medium to dissolve the calcium phosphate, and the mixture was washed, filtered, and dried to obtain developer particles.

Silica Fine Particles

The raw material of silica fine particle was surface-treated with the treatment agents shown in Table 12 to obtain respective silica fine particles 1 to 3. The details of silica fine particles 1 to 3 are shown in Table 12.

The raw material of the silica fine particle is silica fine particle with a BET specific surface area of 120 $m^2/g$ (number-average particle diameter of primary particles: 12 nm).

TABLE 12

| Silica fine particle | Treatment agent |
|---|---|
| Silica fine particle 1 | Dimethylsilicone oil (product name: KF96-50cs, manufactured by Shin-Etsu Chemical Co., Ltd.) |
| Silica fine particle 2 | 3-Aminopropyltriethoxysilane (product name: KBM-903, manufactured by Shin-Etsu Chemical Co., Ltd.) |
| Silica fine particle 3 | Trifluoropropyltrimethoxysilane (product name: KBM-7103, manufactured by Shin-Etsu Chemical Co., Ltd.) |

Production of Developer (Toner) 1

A total of 100 parts by mass of the developer particles were mixed using a Henschel mixer (Mitsui Miike Chemical Engineering Co., Ltd.) with silica fine particle 1 listed in Table 12 that were taken in the parts by mass listed in Table 13 to prepare a developer 1.

The physical properties of the developer 1 are shown in Table 13.

TABLE 13

| Toner | Toner particle Number of parts | Silica fine particle 1 Number of parts | Silica fine particle 2 Number of parts | Silica fine particle 3 Number of parts | Ionization potential [eV] |
|---|---|---|---|---|---|
| Toner 1 | 100 | 3.0 | 0.0 | 0.0 | 5.5 |
| Toner 2 | 100 | 1.0 | 2.0 | 0.0 | 4.6 |
| Toner 3 | 100 | 3.0 | 0.0 | 0.5 | 5.6 |
| Toner 4 | 100 | 2.5 | 0.5 | 0.0 | 5.2 |
| Toner 5 | 100 | 2.0 | 1.0 | 0.0 | 4.9 |
| Toner 6 | 100 | 0.0 | 3.0 | 0.0 | 4.0 |
| Toner 7 | 100 | 2.5 | 0.5 | 0.0 | 5.2 |

Number of parts indicates parts by mass.

Production of Developers (Toners) 2 to 7

The hydrophobic silica fine particle listed in Table 12, which were used in the production of developer 1, were used, and developers 2 to 7 were produced in the same manner as the developer 1, except that the numbers of parts of the hydrophobic silica fine particles were changed as shown in Table 13. The physical properties of developers 2 to 7 are shown in Table 13.

Example 1

Impedance Measurement

Impedance measurement was performed as follows.

First, as a pretreatment, a measurement electrode was prepared by vacuum vapor deposition of platinum on a rotating developer carrying member. For vapor deposition, a vacuum vapor deposition device with a mechanism for gripping the base part of the carrying member, which is the object of vapor deposition, and rotating the base part in the circumferential direction was used, and deposition was performed by controlling the carrier rotation speed, deposition distance, and deposition time so that the film thickness was 100 nm or more. At this time, a masking tape was used to prepare an electrode with a width of 1.5 cm and uniform in the circumferential direction. By forming the electrode with a film thickness of 100 nm or more, the contribution of the contact area between the measurement electrode and the developer carrying member due to the surface coarseness of the developer carrying member can be reduced as much as possible.

Next, an aluminum sheet was wrapped around the electrode without any gaps, and the aluminum sheet was connected to the measurement electrodes of an impedance measuring device (product names: Solartron 1260 and Solartron 1296, manufactured by Solartron Corp.) and a high-voltage system (product names: 6792 and HVA-500, manufactured by Toyo Corporation).

Figure 5:
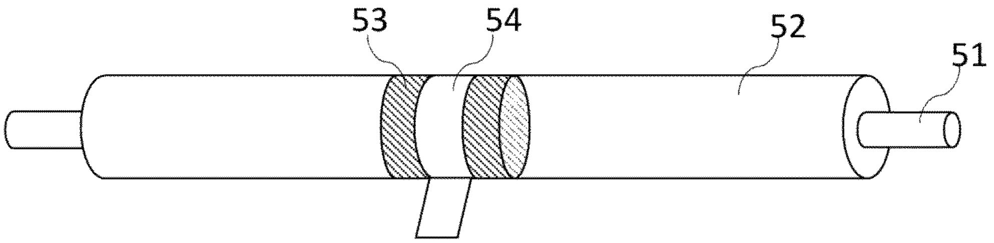
FIG. 5 is a schematic view illustrating a state in which a measurement electrode is formed on a developer carrying member.

FIG. 5 is a schematic view illustrating a state in which the measurement electrode is formed on the developer carrying member. In FIG. 5, reference numeral 51 is a conductive substrate, 52 is a resin layer, 53 is a platinum vapor deposition layer, and 54 is an aluminum sheet. In this figure, the elastic layer is not shown, but it is present between the substrate 51 and the resin layer 52.

Figure 6:
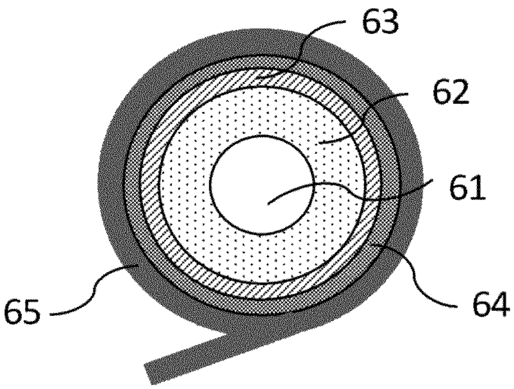
FIG. 6 is a cross-sectional view of a developer carrying member and a measurement electrode.

FIG. 6 is a cross-sectional view of the state in which the measurement electrode is formed on the developer carrying member. Reference numeral 61 is a conductive substrate, 62 is an elastic layer, 63 is a resin layer, 64 is a platinum vapor deposition layer, and 65 is an aluminum sheet. As shown in FIG. 6, it is important to realize a state in which the resin layer is sandwiched between the conductive substrate and the measurement electrode.

Figure 7:
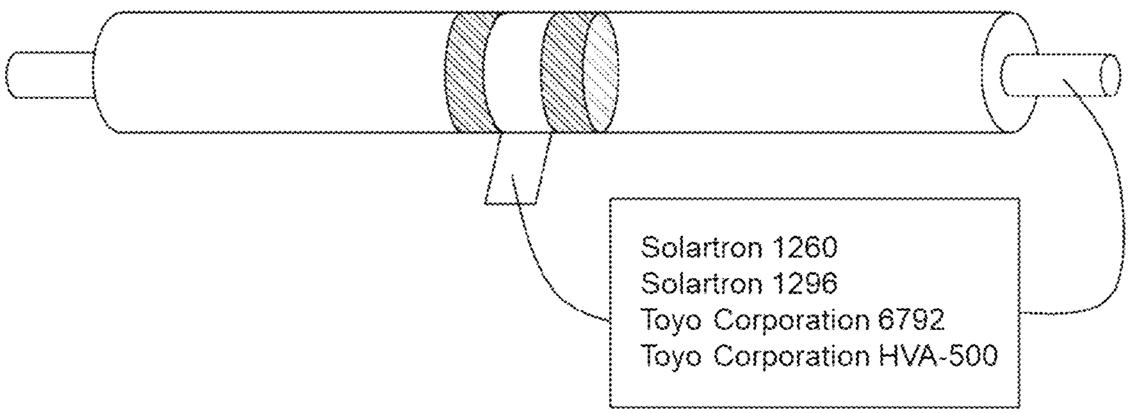
FIG. 7 is a schematic view of an impedance measurement system.

The aluminum sheet was then connected to the impedance measuring device (Solartron 1260 and Solartron 1296, manufactured by Solartron Co.) and the measurement electrode on the high-voltage system (product names: 6792 and HVA-500, Toyo Corporation). FIG. 7 is a schematic view of this measurement system. Impedance measurements were performed by using the conductive substrate and aluminum sheet as the two electrodes for measurement.

The impedance was measured in an environment with a temperature of 23° C. and a relative humidity of 50%, with a DC voltage of 50 V and an AC voltage of 50 V applied, and the absolute value of the impedance was obtained at frequencies of $1.0\times10^{-1}$ to $1.0\times10^{5}$ Hz.

Measurement of Surface Potential

The surface potential of the developer carrying member was measured using a charge quantity measuring device (product name: DRA-2000L, manufactured by QEA, Inc.). Specifically, in an environment with a temperature of 23° C. and a relative humidity of 50%, a grid portion of a corona discharger of the charge quantity measuring device was arranged so that the gap between the grid portion and the outer surface of the developer carrying member was 1.0 mm. The grid portion of the corona discharger of the above device has a width of 3.0 mm.

Next, a voltage of 8 kV was applied to the corona discharger, the corona discharger was moved along the axial direction of the developer carrying member relative thereto at a speed of 400 mm/sec to charge the surface of the conductive member, and the potential of the outer surface was measured 0.06 sec after passing the grid portion. The maximum value of all the measured values measured at 8 points in the longitudinal direction at 45° intervals around the electrophotographic roller was used.

Calculation of Each Physical Property Such as Circle-Equivalent Diameter and Wall Distance of Carbon Black Dispersed in Resin Layer The dispersed particle diameter and wall distance of carbon black dispersed in resin layer were measured by the following method.

First, a slice (thickness of 0.5 to 1.0 mm) was cut out using a razor so that a cross section perpendicular to the longitudinal direction of the developer carrying member could be observed. When the adhesion between the substrate and the resin layer was high and it was difficult to cut out using a razor, the substrate was cut out with a hacksaw or the like, and then the cross section was processed using a FIB (Focused Ion Beam) device.

Then, platinum was vapor deposited onto the slice, and the resin layer was photographed at a magnification of 15,000 times using a scanning electron microscope (SEM) (product name: JSM-7800F, manufactured by JEOL Ltd.) to obtain a cross-sectional image.

Furthermore, in order to quantify the cross-sectional images obtained by SEM observation, the cross-sectional images were converted to 8-bit grayscale using image processing software (product name: Luzex AP, manufactured by Nireco Corporation) to obtain a monochrome image with 256 gradations. Next, the black and white of the image were inverted so that the carbon black in the cross-sectional image became white, and then a binarization threshold was set for the brightness distribution of the image based on the algorithm of Otsu's discriminant analysis method, thereby obtaining a binarized image in which the carbon black was white and the binder resin portion was black.

Then, image processing software (product name: Luzex AP, manufactured by Nireco Corporation) was applied to the obtained binary image to calculate the circle-equivalent diameter and the distance between adjacent wall surfaces of the whitened carbon black portion. The image region for calculating the circle-equivalent diameter and the distance between adjacent wall surfaces was set to a region of 0.075 μm inside the actual image dimensions (where there is a text section describing the SEM measurement conditions and the like, 0.075 μm inside from the portion where the actual image begins) in order to eliminate the uncertainty of the calculated value of the carbon black that is divided at the top, bottom, left, and right ends of the image, and the circle-equivalent diameter and the distance between adjacent wall surfaces for the entire carbon black within the designated image area were calculated.

The arithmetic mean value and standard deviation were calculated for the distribution of the obtained circle-equivalent diameter and the distance between adjacent wall surfaces. As for the number of images used for image analysis, although the results can be obtained without any complications even from one image, at least three or more images were used in order to eliminate the influence of the location difference in the longitudinal direction of the carbon black dispersed in the resin layer of the developer carrying member.

5. Image Evaluation

The image evaluation method is explained below.

Figure 10:
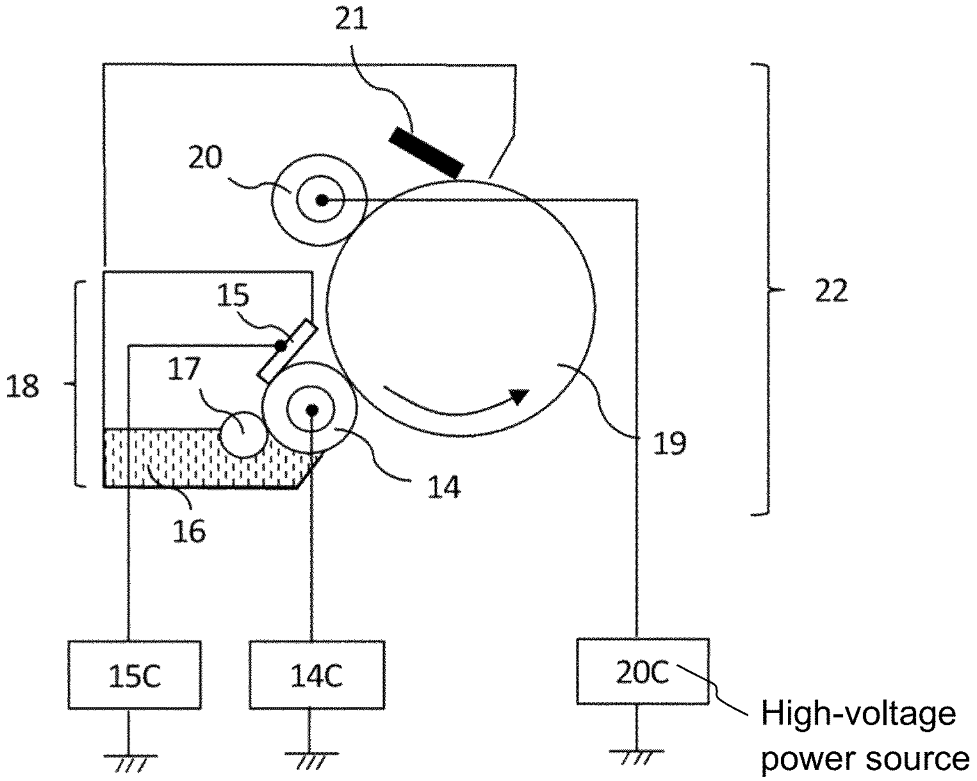
FIG. 10 is a schematic view of an electrophotographic image forming apparatus for image evaluation.

A modified version of the commercially available laser printer LBP-7600C (manufactured by Canon Inc.) was used as the electrophotographic image forming apparatus. The configuration of the modified version is shown in FIG. 10. The printer was modified by connection to an external high-voltage power source 20C in addition to power sources 14C and 15C, so that a freely selected potential difference could be set between the developer layer thickness control member and the developer carrying member, and the output number of sheets per unit time was set to 50 sheets/min for A4 size paper in order to perform evaluation in a high-speed process.

The process cartridge used was a commercially available developer cartridge 318 (black) (manufactured by Canon Inc.), and the developer and developer carrying member were replaced with the combinations shown in Tables 14-1. At this time, the filling amount of the developer was adjusted to 100 g. The product developer was removed from each of the yellow, cyan, and magenta stations, and the evaluation was performed by inserting yellow, cyan, and magenta cartridges in which the developer remaining amount detection mechanism was disabled.

5-1. Fogging Evaluation

The prepared process cartridges were mounted in the main body of an electrophotographic image forming apparatus and allowed to stand in an environment with a temperature of 30° C. and a relative humidity of 80% for 24 h. After that, an external high-voltage power supply was used to set the potential difference between the developer layer thickness control member and the developer carrying member to −300 V, and in the same environment, an image of letter “E” of a 4-point size was continuously output to an A4 evaluation paper (GF-C081, manufactured by Canon Inc.) with a print percentage of 2% of the area of the A4 size paper. A solid white image was output for every 1000 sheets, this operation was repeated up to 20,000 sheets, and the fogging value was measured using the following method.

A total of 10 solid white images were printed continuously at once, and the fogging values of the first and tenth sheets were used.

Using a reflection densitometer (product name: TC-6DS/A, manufactured by Tokyo Denshoku Technology Center Co., Ltd.), the reflection density R1 of the recording material before image formation and the reflection density R2 of the recording material on which a solid white image was printed were measured, and the increase (R2-R1) in reflection density was taken as the “fogging value” of the developer carrying member. The reflection density was measured over the entire image printing region of the recording material, and the maximum value was used.

The smaller the fogging value, the better, and usually the developer is not transferred onto the transfer paper on which the solid white image was formed. Where the charge quantity of the developer is insufficient, the developer moves onto the photosensitive member even when the solid white image is formed, and is further transferred onto the transfer paper, thereby increasing the fogging value. In the evaluation of fogging when the number of sheets output was 0 (initial state) and after 20,000 sheets were output, the fogging values of the first sheet and the tenth sheet were evaluated, respectively. The evaluation results are shown in Table 14-1.

Since fogging is likely to occur in a high-temperature and high-humidity environment with a temperature of 30° C. and a relative humidity of 80%, the evaluation was performed in an environment with a temperature of 30° C. and a relative humidity of 80%.

Evaluation of Coarseness

Coarseness was evaluated by dot reproducibility. The prepared process cartridges were mounted in the main body of an electrophotographic image forming apparatus and allowed to stand in an environment with a temperature of 15° C. and a relative humidity of 10% for 24 h. After that, an external high-voltage power supply was used to set the potential difference between the developer layer thickness control member and the developer carrying member to −300 V, and in the same environment, an image of letter “E” of a 4-point size was continuously output to an A4 evaluation paper (GF-C081, manufactured by Canon Inc.) with a print percentage of 2% of the area of the A4 size paper. A solid white image was output for every 1000 sheets, this operation was repeated up to 20,000 sheets, a halftone (30H) image was formed, and the dot reproducibility of this image was evaluated. A 30H image is a halftone image where 256 gradations are expressed in hexadecimal, with 00H being solid white (non-image) and FFH being a solid image (full-surface image).

For the image, the area of 1000 dots was measured using a VHX-500 digital microscope (wide range zoom lens VH-Z100, manufactured by Keyence Corporation).

The number-average (S) of the dot area and the standard deviation (σ) of the dot area were calculated, and the dot reproducibility index was calculated using the following formula.

The halftone image was evaluated using the dot reproducibility index (I). The smaller the dot reproducibility index (I) value, the better the dot reproducibility.

$$\text{Dot reproducibility index } (I)=\sigma/S\times 100$$

Because coarseness tends to occur more easily in a low-temperature and low-humidity environment with a temperature of 15° C. and a relative humidity of 10%, the evaluation was performed in an environment with a temperature of 15° C. and a relative humidity of 10%.

The evaluation results of Example 1 are shown in Table 14-1.

Examples 2 to 13

In Examples 2 to 13, each measurement and each evaluation were performed in the same manner as in Example 1, except that the developer carrying member and developer were changed to those shown in Table 14-1.

The evaluation results are shown in Tables 14-1 and 14-2.

TABLE 14-1

| | | | | Fogging evaluation (reflection density (%)) | | | | Coarseness evaluation (dot reproducibility index (I)) | | | |
|---|---|---|---|---|---|---|---|---|---|---|---|
| | Developer carrying | | | Initial | | After 20,000 sheets | | Initial | | After 20,000 sheets | |
| Example No. | member No. | Toner | \|I(T) − I(R)\| [eV] | first sheet | after 10 sheets | first sheet | tenth sheet | first sheet | after 10 sheets | first sheet | tenth sheet |
| 1 | 1 | Toner 1 | 0 | 0.3 | 0.4 | 0.5 | 0.8 | 1.0 | 1.1 | 1.4 | 1.5 |
| 2 | 2 | Toner 2 | 0 | 0.3 | 0.4 | 0.5 | 0.8 | 1.0 | 1.1 | 1.4 | 1.5 |
| 3 | 3 | Toner 1 | 0 | 0.3 | 0.4 | 0.5 | 0.8 | 1.1 | 1.3 | 1.5 | 1.6 |
| 4 | 4 | Toner 1 | 0.3 | 0.3 | 0.5 | 0.9 | 1.1 | 1.7 | 1.8 | 2.1 | 2.3 |
| 5 | 5 | Toner 1 | 0.2 | 0.3 | 0.6 | 0.9 | 1.2 | 1.3 | 1.4 | 1.6 | 1.8 |
| 6 | 6 | Toner 1 | 0 | 0.3 | 0.6 | 0.9 | 1.3 | 1.4 | 1.5 | 2.3 | 2.6 |
| 7 | 7 | Toner 1 | 0 | 0.4 | 0.6 | 1.1 | 1.4 | 1.5 | 1.6 | 2.4 | 2.7 |
| 8 | 8 | Toner 1 | 0 | 0.9 | 1.2 | 1.6 | 2.1 | 1.6 | 1.8 | 2.5 | 2.9 |
| 9 | 8 | Toner 3 | 0.1 | 0.9 | 1.2 | 1.6 | 2.1 | 1.8 | 2.1 | 2.8 | 3.2 |
| 10 | 8 | Toner 4 | 0.3 | 1.3 | 1.5 | 2.2 | 2.4 | 2.3 | 2.5 | 2.9 | 3.5 |
| 11 | 9 | Toner 5 | 0.3 | 1.3 | 1.6 | 2.3 | 2.5 | 2.4 | 2.6 | 3.1 | 3.6 |

TABLE 14-1-continued

| Example No. | Developer carrying member No. | Toner | \|I(T) − I(R)\| [eV] | Fogging evaluation (reflection density (%)) Initial first sheet | Initial after 10 sheets | After 20,000 sheets first sheet | After 20,000 sheets tenth sheet | Coarseness evaluation (dot reproducibility index (I)) Initial first sheet | Initial after 10 sheets | After 20,000 sheets first sheet | After 20,000 sheets tenth sheet |
|---|---|---|---|---|---|---|---|---|---|---|---|
| 12 | 10 | Toner 6 | 0.3 | 1.3 | 1.6 | 2.3 | 2.5 | 2.4 | 2.6 | 3.1 | 3.6 |
| 13 | 11 | Toner 7 | 0.3 | 1.4 | 2.1 | 2.4 | 3.1 | 2.6 | 3.4 | 3.2 | 3.8 |

TABLE 14-2

| Comparative Example No. | Developer carrying member No. | Toner | \|I(T) − I(R)\| [eV] | Fogging evaluation (reflection density (%)) Intial first sheet | Intial after 10 sheets | After 20,000 sheets first sheet | After 20,000 sheets tenth sheet | Coarseness evaluation (dot reproducibility index (I)) Initial first sheet | Initial after 10 sheets | After 20,000 sheets first sheet | After 20,000 sheets tenth sheet |
|---|---|---|---|---|---|---|---|---|---|---|---|
| Comparative 1 | 12 | Toner 6 | 0.3 | 4.5 | 4.9 | 8.9 | 9.3 | 5.3 | 5.9 | 6.8 | 7.2 |
| Comparative 2 | 13 | Toner 6 | 0.3 | 0.9 | 9.3 | 1.3 | 12.3 | 1.3 | 8.3 | 1.6 | 9.5 |
| Comparative 3 | 8 | Toner 5 | 0.6 | 1.6 | 1.9 | 2.5 | 3.2 | 4.6 | 5.9 | 6.3 | 8.9 |
| Comparative 4 | 9 | Toner 6 | 0.6 | 2.1 | 2.5 | 2.8 | 3.9 | 4.5 | 5.5 | 6.6 | 9.2 |
| Comparative 5 | 10 | Toner 5 | 0.6 | 2.2 | 2.6 | 2.9 | 3.8 | 4.4 | 5.7 | 6.7 | 9.1 |
| Comparative 6 | 14 | Toner 1 | 0.1 | 1.2 | 9.7 | 1.6 | 13.5 | 1.3 | 9.1 | 2.1 | 9.6 |

Comparative Examples 1-6

In Comparative Examples 1-6, each measurement and each evaluation were performed in the same manner as in Example 1, except that the developer carrying member and developer were changed to those shown in Table 14-2. The evaluation results are shown in Table 14-2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2024-010917, filed Jan. 29, 2024, which is hereby incorporated by reference herein in its entirety.

What is claimed is:

1. A process cartridge comprising:

a developer, a developer carrying member, a developer layer thickness control member that contacts the developer carrying member and controls a layer thickness of the developer carried on the developer carrying member, a contact that is electrically connected to the developer layer thickness control member, and a developer storage member that stores the developer, wherein the process cartridge is detachably attached to a main body of an electrophotographic image forming apparatus, at least a part of the developer layer thickness control member is electrically conductive, where the process cartridge is attached to the main body of the electrophotographic image forming apparatus, the contact is electrically connected to a main body contact of the main body of the electrophotographic image forming apparatus, and a predetermined voltage can be applied to the developer layer thickness control member, the developer carrying member comprises a substrate comprising a conductive outer surface, and a resin layer present on a side of the outer surface of the substrate, where a metal film is provided directly on an outer surface of the developer carrying member, and an AC voltage with an amplitude of 50 V is applied with a frequency being changed between $1.0\times10^{-1}$ to $1.0\times10^{5}$ Hz while applying a DC voltage of 50 V between the outer surface of the substrate and the metal film in an environment of a temperature of 23° C. and a relative humidity of 50%, an impedance at a frequency of $1.0\times10^{0}$ to $1.0\times10^{1}$ Hz is $1.00\times10^{6}\Omega$ or more, where an ionization potential of the developer is denoted by I(T) and an ionization potential of the outer surface of the developer carrying member is denoted by I(R), I(T) and I(R) satisfy following formula (X):

$$|I(T) - I(R)| \leq 0.3\ \text{eV} \quad \text{(X)}$$

and where a corona discharger that has a grid portion with a width of 3.0 mm is arranged such that a distance between the grid portion and the outer surface of the developer carrying member is 1.0 mm and a width direction of the grid portion coincides with an axial direction of the developer carrying member in an environment with a temperature of 23° C. and a relative humidity of 50%, a voltage of 8 kV is applied to the grid portion, the corona discharger is moved along the axial direction of the developer carrying member relative thereto at a speed of 400 mm/sec to charge the outer surface of the developer carrying member, and a potential of the outer surface is measured 0.06 sec after passing the grid portion, the maximum value of the potential is less than 20.0 V.

2. The process cartridge according to claim 1, wherein the ionization potential I(T) of the developer is from 4.0 to 5.6 eV.

3. The process cartridge according to claim 1, wherein an elastic modulus E1 in a region from the outer surface of the developer carrying member to a depth of 0.1 μm is 200 MPa or more, which is measured in a cross section in a thickness direction of the resin layer.

4. The process cartridge according to claim 3, wherein an elastic modulus E2 in a region at a depth of from 1.0 to 1.1 μm deep from the outer surface of the developer carrying member is from 1 to 100 MPa, which is measured in a cross section in the thickness direction of the resin layer.

5. The process cartridge according to claim 1, wherein the resin layer comprises a polyurethane having a polycarbonate structure.

6. The process cartridge according to claim 5, wherein the polyurethane satisfies at least two of the following (A), (B), and (C):

(A) the polyurethane has a structure represented by a following structural formula (1) in a molecule;

(B) the polyurethane has at least one structure selected from the group consisting of a structure represented by a following structural formula (2) and a structure represented by a following structural formula (3) in a molecule; and (C) the polyurethane has a structure represented by a following structural formula (4) in a molecule;

an average number of moles added and represents a number equal to or greater than 1.0.

7. The process cartridge according to claim 5, wherein the polyurethane is a crosslinked urethane resin, the resin layer further comprises a crosslinked acrylic resin, and the crosslinked urethane resin and the crosslinked acrylic resin form an interpenetrating polymer network (IPN) in the resin layer.

8. The process cartridge according to claim 1, wherein the resin layer comprises carbon black, where an arithmetic mean value of a circle-equivalent diameter of the carbon black in the resin layer is denoted by Rc, Rc is 60.0 nm or less, and where a standard deviation of the circle-equivalent diameter is denoted by σc, σc/Rc is from 0.000 to 0.650.

9. The process cartridge according to claim 1, wherein the resin layer comprises carbon black, where an arithmetic mean value of a distance between wall surfaces of the carbon black in the resin layer is denoted by d, d is from 80.0 to 150.0 nm, and where a standard deviation of the distance between the wall surfaces is denoted by σd, σd/d is from 0.000 to 0.600.

10. The process cartridge according to claim 1, wherein an outer surface of the resin layer is the outer surface of the developer carrying member.

11. An electrophotographic image forming apparatus comprising a main body of the electrophotographic image forming apparatus, and Structural formula (1)

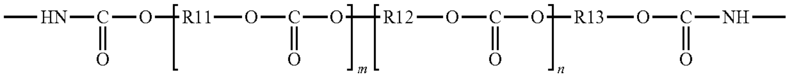

Structural formula (2)

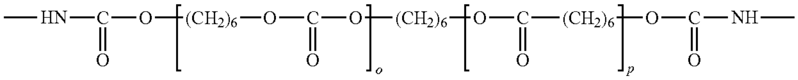

Structural formula (3)

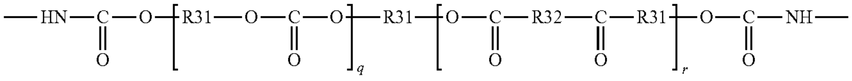

Structural formula (4)

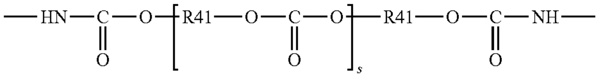

In structural formula (1), R11, R12, and R13 represent divalent hydrocarbon groups having 3 to 9 carbon atoms, however, R11 and R12 are different from each other, and R13 is the same as at least one selected from the group consisting of R11 and R12, m and n are an average number of moles added, and each independently represent a number of 1.0 or more, In structural formula (2), o and p are an average number of moles added, and each independently represent a number of 1.0 or more, In structural formula (3), R31 and R32 each independently represent a divalent hydrocarbon group having 3 to 8 carbon atoms, q and r each independently represent an average number of moles added, and each independently represent a number equal to or greater than 1.0, In structural formula (4), R41 represents a divalent hydrocarbon group having 6 to 9 carbon atoms, s represents a process cartridge detachably attached to the main body, wherein the process cartridge is the process cartridge according to claim 1, the main body has a main body contact that is electrically connected to the contact of the process cartridge when the process cartridge is attached to the main body, and a predetermined voltage can be applied to the developer layer thickness control member when the process cartridge is attached to the main body.

12. An electrophotographic image forming apparatus comprising:

a developer, a developer carrying member, a developer layer thickness control member that contacts the developer carrying member and controls a layer thickness of the developer carried on the developer carrying member, and a developer storage member that stores the developer, wherein at least a part of the developer layer thickness control member is electrically conductive, a predetermined voltage can be applied to the developer layer thickness control member, the developer carrying member comprises a substrate comprising a conductive outer surface, and a resin layer present on a side of the outer surface of the substrate, where a metal film is provided directly on an outer surface of the developer carrying member, and an AC voltage with an amplitude of 50 V is applied with a frequency being changed between $1.0\times10^{-1}$ to $1.0\times10^{5}$ Hz while applying a DC voltage of 50 V between the outer surface of the substrate and the metal film in an environment of a temperature of 23° C. and a relative humidity of 50%, an impedance at a frequency of $1.0\times10^{0}$ to $1.0\times10^{1}$ Hz is $1.00\times10^{6}\Omega$ or more, where an ionization potential of the developer is denoted by I(T) and an ionization potential of the outer surface of the developer carrying member is denoted by I(R), I(T) and I(R) satisfy following formula (X):

$$|I(T)-I(R)| \leq 0.3\ \text{eV} \quad (X)$$

and where a corona discharger that has a grid portion with a width of 3.0 mm is arranged such that a distance between the grid portion and the outer surface of the developer carrying member is 1.0 mm and a width direction of the grid portion coincides with an axial direction of the developer carrying member in an environment with a temperature of 23° C. and a relative humidity of 50%, a voltage of 8 kV is applied to the grid portion, the corona discharger is moved along the axial direction of the developer carrying member relative thereto at a speed of 400 mm/sec to charge the outer surface of the developer carrying member, and a potential of the outer surface is measured 0.06 sec after passing the grid portion, the maximum value of the potential is less than 20.0 V.

* * * * *